US009526097B2

(12) United States Patent
Nakao et al.

(10) Patent No.: US 9,526,097 B2
(45) Date of Patent: *Dec. 20, 2016

(54) COMMUNICATION APPARATUS AND RETRANSMISSION CONTROL METHOD

(71) Applicant: Sun Patent Trust, New York, NY (US)

(72) Inventors: Seigo Nakao, Singapore (SG); Akihiko Nishio, Osaka (JP); Masayuki Hoshino, Kanagawa (JP); Ayako Horiuchi, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/959,754

(22) Filed: Dec. 4, 2015

(65) Prior Publication Data

US 2016/0088598 A1 Mar. 24, 2016

Related U.S. Application Data

(63) Continuation of application No. 14/488,113, filed on Sep. 16, 2014, now Pat. No. 9,236,994, which is a
(Continued)

(30) Foreign Application Priority Data

Aug. 7, 2009 (JP) .................................. 2009-185152

(51) Int. Cl.
*H04W 4/00* (2009.01)
*H04L 12/26* (2006.01)
(Continued)

(52) U.S. Cl.
CPC .......... *H04W 72/042* (2013.01); *H04L 1/0029* (2013.01); *H04L 1/08* (2013.01);
(Continued)

(58) Field of Classification Search
CPC ..... H04W 72/042; H04W 76/048; H04L 1/08; H04L 5/0055; H04L 1/1861; H04L 1/1854; H04L 1/0029; H04L 1/1607; H04L 5/0053
See application file for complete search history.

(56) References Cited

U.S. PATENT DOCUMENTS 6,507,628 B1 *  1/2003  McCallister ...... H04L 25/03178
                                                    375/254
2010/0074120 A1 *  3/2010  Bergman ............. H04L 1/0057
                                                    370/244
(Continued)

FOREIGN PATENT DOCUMENTS

CN  101478379 A  7/2009
CN  101502158 A  8/2009
(Continued)

OTHER PUBLICATIONS

3GPP TS 36.211 V8.7.0, 3rd Generation Partnership Project; Technical Specification Group Radio Access Network; Evolved Universal Terrestrial Radio Access (E-UTRA); Physical Channels and Modulation (Release 8), May 2009, 83 pages.
(Continued)

*Primary Examiner* — Kiet Tang
(74) *Attorney, Agent, or Firm* — Seed Intellectual Property Law Group LLP

(57) ABSTRACT

Provided are a communication apparatus and a method for receiving a response signal transmitted from a terminal configured with one or more downlink component carriers. The communication apparatus includes a transmitting section and a receiving section. The transmitting section is configured to transmit, to the terminal, downlink assignment information indicating one or more resources for downlink data, each of the one or more resources being assigned to one of the one or more downlink component carrier(s), and
(Continued)

configured to transmit the downlink data to the terminal. The receiving section is configured to receive one or more response signals for the downlink data, which are transmitted from the terminal. The terminal makes the phase points of the response signals different in accordance with a number of downlink data which has been successively received.

21 Claims, 20 Drawing Sheets

Related U.S. Application Data continuation of application No. 13/389,255, filed as application No. PCT/JP2010/004970 on Aug. 6, 2010, now Pat. No. 8,867,465.

(51) Int. Cl.
| | | |
|---|---|---|
| H04L 27/06 | (2006.01) | |
| H04W 72/04 | (2009.01) | |
| H04L 1/00 | (2006.01) | |
| H04L 1/16 | (2006.01) | |
| H04L 1/18 | (2006.01) | |
| H04L 5/00 | (2006.01) | |
| H04W 28/12 | (2009.01) | |
| H04L 1/08 | (2006.01) | |
| H04W 76/04 | (2009.01) | |
| H04W 28/06 | (2009.01) | |

(52) U.S. Cl.
CPC .......... *H04L 1/1607* (2013.01); *H04L 1/1854* (2013.01); *H04L 1/1861* (2013.01); *H04L 5/001* (2013.01); *H04L 5/0053* (2013.01); *H04L 5/0055* (2013.01); *H04W 28/12* (2013.01); *H04W 76/048* (2013.01); *H04W 28/06* (2013.01)

(56) References Cited

U.S. PATENT DOCUMENTS

| | | | |
|---|---|---|---|
| 2010/0172290 A1* | 7/2010 | Nam | H04L 1/1854 370/328 |
| 2010/0232378 A1 | 9/2010 | Imamura et al. | |
| 2012/0092982 A1 | 4/2012 | Nakao et al. | |

FOREIGN PATENT DOCUMENTS

| | | |
|---|---|---|
| CN | 102461245 A | 5/2012 |
| EP | 1 524 791 A2 | 4/2005 |
| EP | 2 007 021 A1 | 12/2008 |
| JP | 2009-273171 A | 11/2009 |
| WO | 2009/037853 A1 | 3/2009 |

OTHER PUBLICATIONS

3GPP TS 36.212 V8.7.0, 3rd Generation Partnership Project; Technical Specification Group Radio Access Network; Evolved Universal Terrestrial Radio Access (E-UTRA); Multiplexing and channel coding (Release 8), May 2009, 60 pages.

3GPP TS 36.213 V8.7.0, 3rd Generation Partnership Project; Technical Specification Group Radio Access Network; Evolved Universal Terrestrial Radio Access (E-UTRA); Physical layer procedures (Release 8), May 2009, 77 pages.

CATT, "Multi-channel Transmission for UL ACK/NACK in LTE-A," R1-092788, 3GPP TSG RAN WG1 meeting # 57bis, Los Angeles, CA, USA, Jun. 29-Jul. 3, 2009, 3 pages.

CATT, "UL ACK/NACK transmission scheme for LTE-A," R1-092789, GPP TSG RAN WG1 meeting # 57bis, Los Angeles, CA, USA, Jun. 29-Jul. 3, 2009, 3 pages.

English Translation of Chinese Search Report dated Nov. 27, 2013, for corresponding CN Application No. 201080030964.0, 2 pages.

Huawei, Texas Instruments, ZTE, Ericsson, Nokia, Nokia Siemens Networks, CMCC, CATT, "Draft CR on corrections for TDD ACK/NACK bundling and multiplexing," R1-084345, 3GPP TSG RAN Meeting #55, Prague, Czech Republic, Nov. 10-14, 2008, 8 pages.

International Search Report for PCT/JP2010/004970, mailed Oct. 19, 2010, 2 pages.

Nakao et al, "Performance enhancement of E-UTRA uplink control channel in fast fading environments," IEEE 69th Vehicular Technology Conference, 2009, VTC Spring 2009, 5 pages.

Nokia Siemens Networks, Nokia, "UL control signalling to support bandwidth extension in LTE-Advanced," R1-090724, 3GPP TSG RAN WG1 Meeting #56, Athens, Greece, Feb. 9-13, 2009, 5 pages.

Nokia Siemens Networks, Nokia, "UL control signalling for carrier aggregation," R1-092572, 3GPP TSG RAN WG1 Meeting # 57bis, Los Angeles, CA, USA, Jun. 29-Jul. 3, 2009, 4 pages.

Panasonic, "UL ACK/NACK transmission on PUCCH for carrier aggregation," R1-092535, 3GPP TSG-RAN WG1 Meeting # 57bis, Los Angeles, USA, Jun. 29-Jul. 3, 2009, 4 pages.

Samsung, "Further consideration on ACK/NACK multiplexing in TDD," R1-083560, 3GPP TSG RAN WG1 Meeting #54bis, Prague, Czech Republic, Sep. 29-Oct. 3, 2008, 5 pages.

Texas Instruments, Ericsson, Huawei, ZTE, CATT, "Correction on TDD ACK/NAK multiplexing mapping scheme for M=4," R1-084509, 3GPP TSG RAN WG1 #55, Prague, Czech Republic, Nov. 10-14, 2008, pp. 1-3.

Texas Instruments, "Multiple ACK/NAK Transmission in TDD," R1-083124, Agenda Item: 6.3, 3GPP TSG RAN WG1 #54, Jeju, South Korea, Aug. 18-22, 2008, 5 pages.

Texas Instrucments, "ACK/NAK DTX Detection for Concurrent Transmission of ACK/NAK and SRI," R1-082487, 3GPP TSG RAN WG1 #53b, Warsaw, Poland, Jun. 30-Jul. 4, 2008, pp. 1-3.

ZTE, "Uplink Control Channel Design for LTE-Advanced," R1-092464, TSG-RAN WG1 #57bis, San Francisco, USA, Jun. 29-Jul. 3, 2009, 6 pages.

\* cited by examiner

COMMUNICATION APPARATUS AND RETRANSMISSION CONTROL METHOD

TECHNICAL FIELD

The present invention relates to a terminal apparatus and a retransmission control method.

3GPP LTE adopts OFDMA (Orthogonal Frequency Division Multiple Access) as a downlink communication scheme. In a radio communication system to which 3GPP LTE is applied, a base station transmits a synchronization signal (Synchronization Channel: SCH) and broadcast signal (Broadcast Channel: BCH) using predetermined communication resources. A terminal secures synchronization with the base station by catching an SCH first. After that, the terminal acquires parameters specific to the base station (e.g. frequency bandwidth) by reading BCH information (see Non-Patent Literatures 1, 2 and 3).

Furthermore, after completing the acquisition of parameters specific to the base station, the terminal makes a connection request to the base station to thereby establish communication with the base station. The base station transmits control information to the terminal with which communication is established via a PDCCH (Physical Downlink Control CHannel) as required.

The terminal then performs a "blind decision" on each of a plurality of pieces of control information included in the received PDCCH signal. That is, the control information includes a CRC (Cyclic Redundancy Check) portion and this CRC portion is masked with a terminal ID of the transmission target terminal in the base station. Therefore, the terminal cannot decide whether or not the control information is directed to the terminal until the CRC portion of the received control information is demasked with the terminal ID of the terminal. When the demasking result illustrates that the CRC calculation is OK in the blind decision, the control information is decided to be directed to the terminal.

Furthermore, in 3GPP LTE, ARQ (Automatic Repeat Request) is applied to downlink data from a base station to a terminal. That is, the terminal feeds back a response signal indicating the error detection result of the downlink data to the base station. The terminal performs a CRC on the downlink data and feeds back ACK (Acknowledgment) when CRC=OK (no error) and NACK (Negative Acknowledgment) when CRC=NG (error present) as a response signal to the base station. An uplink control channel such as PUCCH (Physical Uplink Control Channel) is used for feedback of this response signal (that is, ACK/NACK signal).

Here, the control information transmitted from the base station includes resource assignment information including resource information or the like assigned by the base station to the terminal. The aforementioned PDCCH is used for transmission of this control information. This PDCCH is made up of one or a plurality of L1/L2 CCHs (L1/L2 Control Channels). Each L1/L2 CCH is made up of one or a plurality of CCEs (Control Channel Elements). That is, a CCE is a base unit when control information is mapped to a PDCCH. Furthermore, when one L1/L2 CCH is made up of a plurality of CCEs, a plurality of continuous CCEs are assigned to the L1/L2 CCH. The base station assigns an L1/L2 CCH to the resource assignment target terminal according to the number of CCEs necessary to report control information for the resource assignment target terminal. The base station then transmits control information mapped to physical resources corresponding to the CCEs of the L1/L2 CCH.

Here, each CCE has a one-to-one correspondence with a constituent resource of the PUCCH. Therefore, the terminal that has received the L1/L2 CCH identifies constituent resources of the PUCCH corresponding to CCEs making up the L1/L2 CCH and transmits a response signal to the base station using the resources. However, when a plurality of CCEs where there are continuous L1/L2 CCHs are occupied, the terminal transmits a response signal to the base station using one of the plurality of PUCCH constituent resources (e.g. PUCCH constituent resources corresponding to a CCE having the smallest index) corresponding to the plurality of respective CCEs. This allows downlink communication resources to be used efficiently.

As illustrated in FIG. 1, a plurality of response signals transmitted from a plurality of terminals are spread by a ZAC (Zero Auto-correlation) sequence having a Zero Auto-correlation characteristic, Walsh sequence and DFT (Discrete Fourier Transform) sequence on the time axis and code-multiplexed within the PUCCH. In FIG. 1, (W0, W1, W2, W3) represents a Walsh sequence having a sequence length of 4 and (F0, F1, F2) represents a DFT sequence having a sequence length of 3. As illustrated in FIG. 1, in the terminal, a response signal such as ACK or NACK is primary-spread by a ZAC sequence (sequence length 12) into a frequency component corresponding to 1 SC-FDMA symbol on the frequency axis first. Next, the primary-spread response signal and the ZAC sequence as a reference signal are secondary-spread in association with a Walsh sequence (sequence length 4: W0 to W3) and DFT sequence (sequence length 3: F0 to F3) respectively. Furthermore, the secondary-spread signal is further transformed into a signal having a sequence length of 12 on the time axis through IFFT (Inverse Fast Fourier Transform). A CP is added to each signal after the IFFT and a one-slot signal made up of seven SC-FDMA symbols is thereby formed.

Response signals transmitted from different terminals are spread using a ZAC sequence corresponding to different cyclic shift indices or orthogonal code sequences corresponding to different sequence numbers (orthogonal cover Index: OC index). The orthogonal code sequence is a combination of a Walsh sequence and a DFT sequence. Furthermore, the orthogonal code sequence may be referred to as a "block-wise spreading code." Therefore, the base station can demultiplex a plurality of code-multiplexed response signals using conventional despreading and correlation processing (see Non-Patent Literature 4).

However, since each terminal performs a blind decision on a downlink assignment control signal directed to the terminal in each subframe, the terminal side does not necessarily succeed in receiving the downlink assignment control signal. When the terminal fails to receive the downlink assignment control signal directed to the terminal in a certain downlink component band, the terminal cannot even know whether or not there is downlink data directed to the terminal in the downlink component band. Therefore, when failing to receive the downlink assignment control signal in a certain downlink component band, the terminal cannot even generate a response signal for the downlink data in the downlink component band. This error case is defined as a DTX of response signal (DTX (Discontinuous transmission) of ACK/NACK signals) in the sense that transmission of the response signal is not performed on the terminal side.

Furthermore, standardization of 3GPP LTE-advanced which realizes faster communication than 3GPP LTE has started. A 3GPP LTE-advanced system (hereinafter, may also be referred to as "LTE-A system") follows the 3GPP LTE system (hereinafter also referred to as "LTE system").

In order to realize a downlink transmission rate of a maximum of 1 Gbps or above, 3GPP LTE-advanced is expected to introduce base stations and terminals capable of communicating at a wideband frequency of 40 MHz or above.

In an LTE-A system, to realize communication at an ultra-high transmission rate several times as fast as the transmission rate in an LTE system and backward compatibility with the LTE system simultaneously, a band for the LTE-A system is divided into "component bands" of 20 MHz or less, which is a support bandwidth for the LTE system. That is, the "component band" is a band having a width of maximum 20 MHz and defined as a base unit of a communication band. Furthermore, a "component band" in a downlink (hereinafter referred to as "downlink component band") may be defined as a band divided by downlink frequency band information in a BCH broadcast from the base station or by a spreading width when the downlink control channel (PDCCH) is spread and arranged in the frequency domain. On the other hand, a "component band" in an uplink (hereinafter referred to as "uplink component band") may be defined as a band divided by uplink frequency band information in a BCH broadcast from the base station or as a base unit of a communication band of 20 MHz or less including a PUSCH (Physical Uplink Shared CHannel) region near the center and PUCCHs for LTE at both ends. Furthermore, in 3GPP LTE-Advanced, the "component band" may also be expressed as "component carrier(s)" in English.

The LTE-A system supports communication using a band that bundles several component bands, so-called "carrier aggregation." Since throughput requirements for an uplink are generally different from throughput requirements for a downlink, in the LTE-A system, studies are being carried out on carrier aggregation using different numbers of component bands set for an arbitrary LTE-A system compatible terminal (hereinafter referred to as "LTE-A terminal") between the uplink and downlink, so-called "asymmetric carrier aggregation." Cases are also supported where the number of component bands is asymmetric between the uplink and downlink and the frequency bandwidth differs from one component band to another.

FIGS. 2A and 2B illustrate asymmetric carrier aggregation and its control sequence applied to individual terminals. FIGS. 2A and 2B illustrate an example where the bandwidth and the number of component bands are symmetric between the uplink and downlink of a base station.

In FIGS. 2A and 2B, a setting (configuration) is made for terminal 1 such that carrier aggregation is performed using two downlink component bands and one uplink component band on the left side, whereas a setting is made for terminal 2 such that although the two same downlink component bands as those in terminal 1 are used, the uplink component band on the right side is used for uplink communication.

Focusing attention on terminal 1, signals are transmitted/received between an LTE-A base station and LTE-A terminal making up an LTE-A system according to the sequence diagram illustrated in FIG. 2A. As illustrated in FIG. 2A, (1) terminal 1 establishes synchronization with the downlink component band on the left side at a start of communication with the base station and reads information of the uplink component band which forms a pair with the downlink component band on the left side from a broadcast signal called "SIB2 (System Information Block Type 2)." (2) Using this uplink component band, terminal 1 starts communication with the base station by transmitting, for example, a connection request to the base station. (3) Upon deciding that a plurality of downlink component bands need to be assigned to the terminal, the base station instructs the terminal to add a downlink component band. In this case, however, the number of uplink component bands does not increase and terminal 1 which is an individual terminal starts asymmetric carrier aggregation.

Furthermore, in LTE-A to which the aforementioned carrier aggregation is applied, the terminal may receive a plurality of pieces of downlink data in a plurality of downlink component bands at a time. In LTE-A, studies are being carried out on channel selection (also referred to as "multiplexing") as one of transmission methods for a plurality of response signals for the plurality of pieces of downlink data. In channel selection, not only symbols used for a response signal but also resources to which the response signal is mapped are changed according to a pattern of error detection results regarding the plurality of pieces of downlink data. That is, channel selection is a technique that changes not only phase points (that is, constellation points) of a response signal but also resources used to transmit the response signal based on whether each of response signals for a plurality of pieces of downlink data received in a plurality of downlink component bands as illustrated in FIG. 3 is ACK or NACK (see Non-Patent Literatures 5 6 and 7).

Here, ARQ control by channel selection when the above-described asymmetric carrier aggregation is applied to a terminal will be described in detail using FIG. 3.

When, for example, a component band group made up of downlink component bands 1 and 2, and uplink component band 1 (which may be expressed as "component carrier set" in English) is set for terminal 1 as illustrated in FIG. 3, downlink resource assignment information is transmitted from the base station to terminal 1 via respective PDCCHs of downlink component bands 1 and 2 and then downlink data is transmitted using resources corresponding to the downlink resource assignment information.

When the terminal succeeds in receiving downlink data in component band 1 and fails to receive downlink data in component band 2 (that is, when the response signal of component band 1 is ACK and the response signal of component band 2 is NACK), the response signal is mapped to PUCCH resources included in PUCCH region 1 and a first phase point (e.g. phase point of (1,0) or the like) is used as a phase point of the response signal. On the other hand, when the terminal succeeds in receiving downlink data in component band 1 and also succeeds in receiving downlink data in component band 2, the response signal is mapped to PUCCH resources included in PUCCH region 2 and the first phase point is used. That is, when there are two downlink component bands, since there are four error detection result patterns, the four patterns can be represented by combinations of two resources and two types of phase point.

CITATION LIST

Non-Patent Literature

NPL 1
3GPP TS 36.211 V8.7.0, "Physical Channels and Modulation (Release 8)," May 2009
NPL 2
3GPP TS 36.212 V8.7.0, "Multiplexing and channel coding (Release 8)," May 2009
NPL 3
3GPP TS 36.213 V8.7.0, "Physical layer procedures (Release 8)," May 2009

NPL 4

Seigo Nakao et al. "Performance enhancement of E-UTRA uplink control channel in fast fading environments", Proceeding of VTC2009 spring, April, 2009

NPL 5

ZTE, 3GPP RAN1 meeting #57bis, R1-092464, "Uplink Control Channel Design for LTE-Advanced," June 2009

NPL 6

Panasonic, 3GPP RAN1 meeting #57bis, R1-092535, "UL ACK/NACK transmission on PUCCH for carrier aggregation," June 2009

NPL 7

Nokia Siemens Networks, Nokia, 3GPP RAN1 meeting #57bis, R1-092572, "UL control signalling for carrier aggregation," June 2009

SUMMARY OF INVENTION

Technical Problem

As described above, the terminal does not necessarily successfully receive downlink assignment control information transmitted from the base station and the terminal may not be able to recognize a presence of downlink data transmitted through a certain downlink component band. To avoid a problem that the presence of downlink data cannot be recognized, for example, in NPL 7, DAI (Downlink Assignment Indicator) is inserted into downlink assignment control information transmitted through every component band. The DAI indicates a downlink component band assigned to downlink data. Even when the terminal does not successfully receive downlink assignment control information in a first downlink component band, if the terminal successfully receives downlink assignment control information in a second downlink component band, the terminal can recognize a presence of downlink data directed to the terminal in the first downlink component band on the basis of DAI included in the downlink assignment control information in the second downlink component band.

If the DAI is applied to channel selection while carrier aggregation is performed, it is considered that the terminal performs transmission control of response signal as described below. FIG. 4 illustrates a relationship between a resource (horizontal axis) used by a terminal to transmit a response signal and a component band number (vertical axis) where the terminal receives downlink assignment control information when DAI is applied to channel selection while carrier aggregation is performed.

As illustrated in FIG. 4, for example, if the base station transmits downlink assignment control information to the terminal only in downlink component band 1, the terminal transmits ACK of NACK depending on a decoding result of data illustrated by the downlink assignment control information by using PUCCH resource 1 (see the constellation of the cell (1, 1) specified by DL1 and PUCCH resource 1 in FIG. 4). In the constellation of the cell (1, 1), ACK is associated with a phase point (0, −j) and NACK is associated with a phase point (0, j). However, when the terminal fails to receive the downlink assignment control information, the terminal cannot know that there is data directed to the terminal. As a result, a condition where neither ACK nor NACK is present, that is, a condition of DTX, is generated.

When the base station transmits downlink assignment control information to the terminal in downlink component bands 1 and 2, the terminal feeds back a response signal to the base station according to a condition of success/failure in reception of downlink data by using either PUCCH resource 1 or PUCCH resource 2 (see the constellations of the cell (2, 1) and the cell (2, 2) in FIG. 4). For example, when the terminal successfully receives the downlink assignment control information transmitted in downlink component bands 1 and 2 and successfully receives downlink data indicated by the downlink assignment control information, the terminal notifies the base station of a condition of ACK/ACK (A/A in FIG. 4) by using the phase point (−1, 0) of PUCCH resource 2. When the terminal successfully receives the downlink assignment control information transmitted in downlink component band 1 and successfully receives downlink data indicated by the downlink assignment control information but fails to receive the downlink assignment control information transmitted in downlink component band 2, the terminal recognizes that there is a data assignment directed to the terminal in downlink component band 2 from DAI information included in the downlink assignment control information in downlink component band 1. In this case, the terminal notifies the base station of a condition of ACK/DTX (A/D in FIG. 4) by using the phase point (0, −j) of PUCCH resource 1. However, when the terminal fails to receive both the two pieces of downlink assignment control information, the terminal cannot know the data assigned to the terminal. As a result, the terminal transmits no response signal.

In FIG. 4, N means NACK.

Here, if the base station does not transmit DAI to the terminal, a problem as described below occurs. FIGS. 5A and 5B are conceptual diagrams of a case where: the base station transmits downlink assignment control information and data to the terminal in downlink component bands 1, 2, and 3; and the terminal successfully receives downlink assignment control information only in downlink component bands 1 and 3. FIG. 5A is a mapping of channel selection recognized by the base station and FIG. 5B is a mapping of channel selection recognized by the terminal.

Here, as described above, it is assumed that the base station does not transmit DAI to the terminal. Therefore, when the terminal successfully receives both downlink data transmitted in downlink component bands 1 and 3, the terminal falsely recognizes that data are transmitted from the base station only in downlink component bands 1 and 3. Then, based on this recognition, the terminal feeds back a response signal by using the phase point (−1, 0) corresponding to ACK/ACK in PUCCH resource 3.

However, when the response signal of the phase point (−1, 0) in PUCCH 3 is fed back, the base station, which recognizes that data are transmitted to the terminal in downlink component bands 1, 2, and 3, recognizes that the reception condition of the terminal is ACK/ACK/ACK on the basis of the response signal. Then the base station recognizes that retransmission is not necessary because all data are successfully transmitted, so the base station discards the data. As a result, even though the downlink data transmitted through downlink component band 2 (downlink data 2) does not reach the terminal, the terminal cannot receive retransmission of downlink data 2. That is, QoS of downlink data 2 is significantly degraded.

As described above, while DAI is important information for performing channel selection without problem, increase in overhead of downlink assignment control information caused by transmission of DAI cannot be ignored when considering that the information size of downlink assignment control information is small.

It is therefore an object of the present invention to provide a terminal apparatus and retransmission control method which can maintain quality of downlink data transmitted in each downlink component band, while suppressing an increase in overhead of downlink assignment control information, when carrier aggregation communication using a plurality of downlink component bands is applied.

Solution to Problem

A terminal apparatus according to the present invention is a terminal apparatus that communicates with a base station using a component band group including a plurality of downlink component bands and at least one uplink component band, including a control information receiving section that receives downlink assignment control information transmitted through a downlink control channel of at least one downlink component band in the component band group, a downlink data receiving section that receives downlink data transmitted through a downlink data channel indicated by the downlink assignment control information, an error detection section that detects a reception error of the received downlink data, and a response control section that transmits a response signal through an uplink control channel of the uplink component band on the basis of an error detection result obtained by the error detection section and a transmission rule table of response signal, wherein, in the transmission rule table, a pattern candidate of error detection result obtained by the error detection section is associated with a phase point of a response signal transmitted by the response control section, a group of pattern candidates where the numbers of ACKs included in a pattern are different are respectively associated with phase points different from each other, and a group of pattern candidates where the numbers of ACKs included in a pattern are the same are associated with the same phase point.

A retransmission control method according to the present invention includes a control information receiving step of receiving downlink assignment control information transmitted through a downlink control channel of at least one downlink component band included in a component band group including a plurality of downlink component bands and at least one uplink component band, a downlink data receiving step of receiving downlink data transmitted through a downlink data channel indicated by the downlink assignment control information, an error detection step of detecting a reception error of the received downlink data, and a response control step of transmitting a response signal through an uplink control channel of the uplink component band on the basis of a pattern of error detection result obtained in the error detection step, wherein the response control step differentiates a phase point of a response signal according to the number of ACKs in a pattern of error detection result, and if there are a plurality of patterns of error detection result where the number of ACKs is the same, the response control step sets the same phase point of response signal among the patterns.

Advantageous Effects of Invention

According to the present invention, it is possible to provide a terminal apparatus and retransmission control method which can maintain quality of downlink data transmitted in each downlink component band, while suppressing an increase in overhead of downlink assignment control information, when carrier aggregation communication using a plurality of downlink component bands is applied.

DESCRIPTION OF EMBODIMENTS

Figure 1:
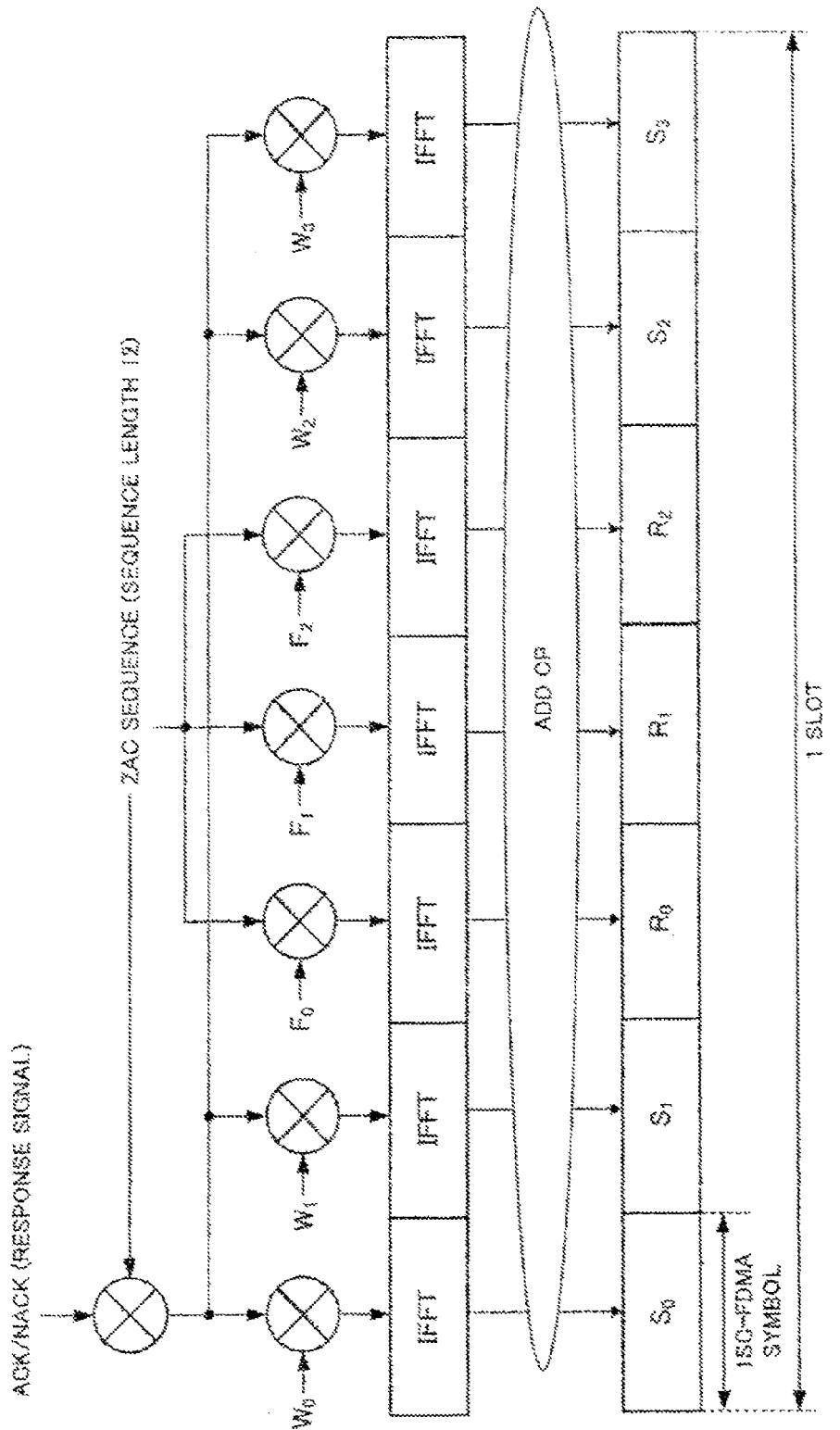
FIG. 1 illustrates a method of spreading a response signal and reference signal.
Figure 2B:
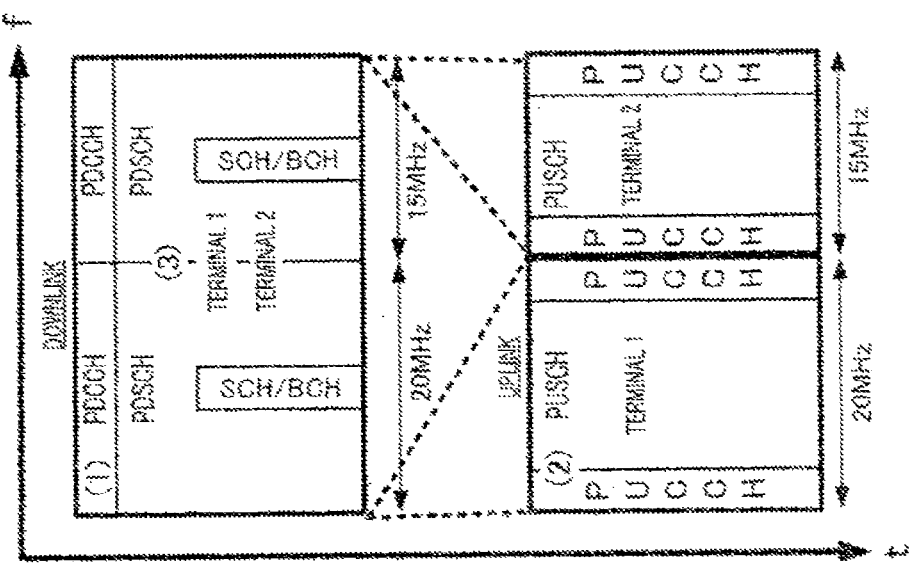
FIGS. 2A and 2B illustrate asymmetric carrier aggregation applied to individual terminals and a control sequence thereof.
Figure 2A:
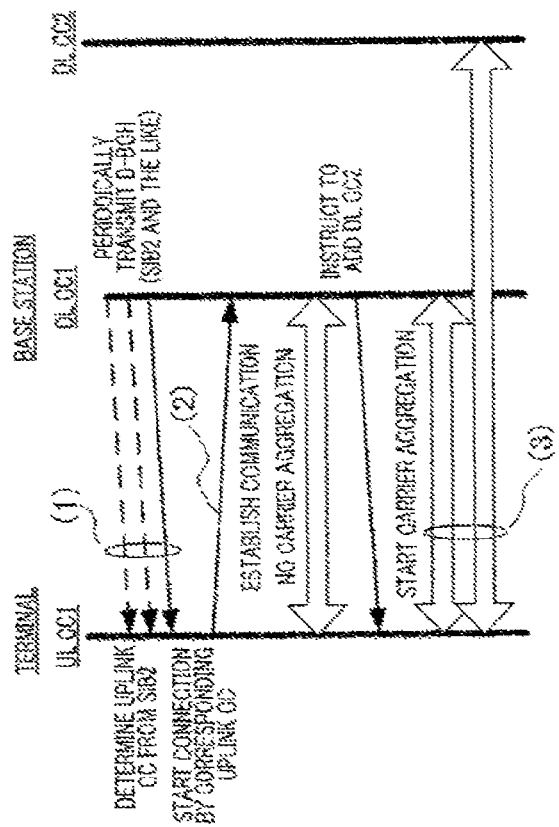
Figure 3:
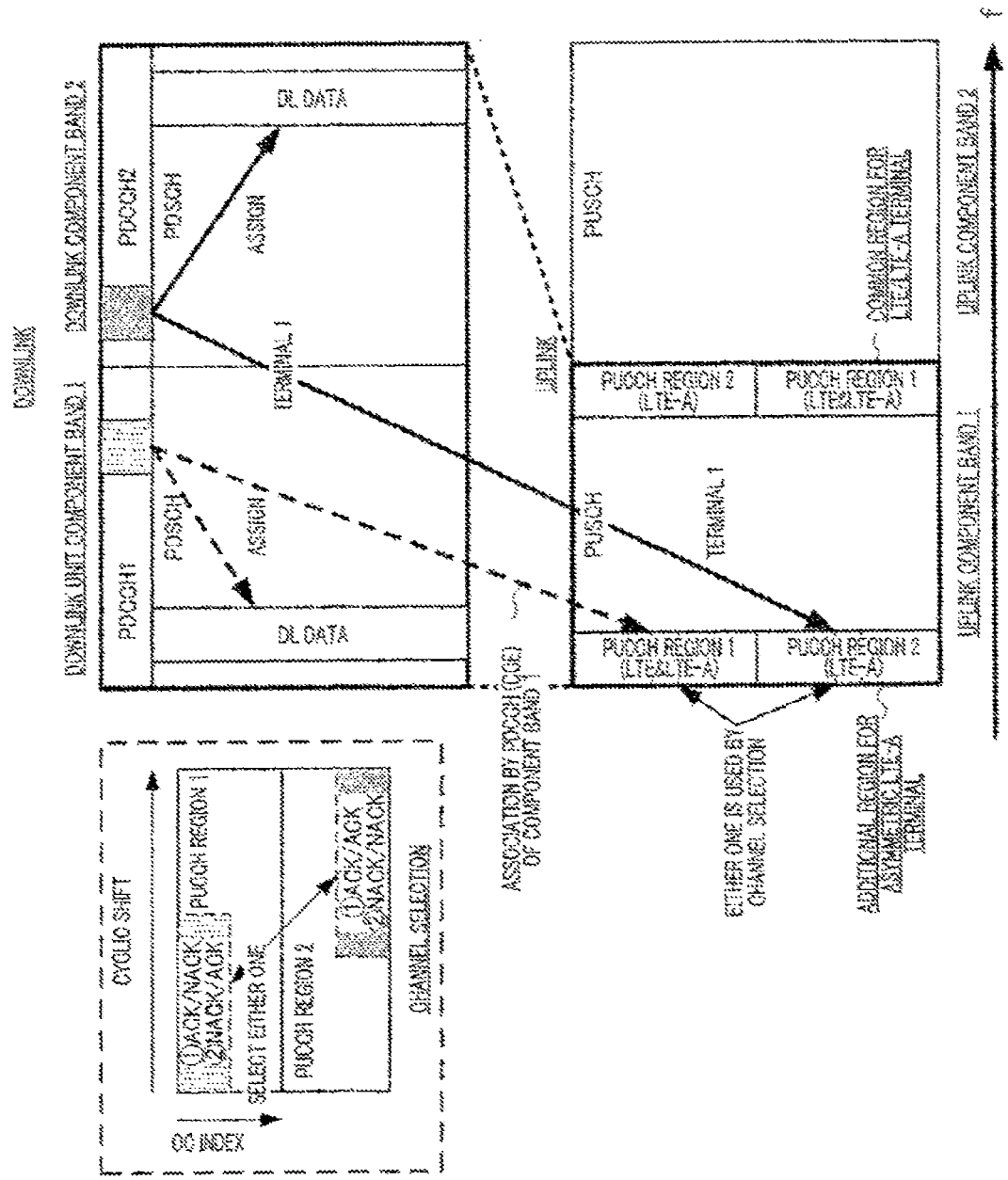
FIG. 3 illustrates ARQ control when carrier aggregation is applied to a terminal.

Hereinafter, embodiments of the present invention will be described in detail with reference to the accompanying drawings. The same components among different embodiments will be assigned the same reference numerals and overlapping descriptions thereof will be omitted.

Embodiment 1

Overview of Communication System

A communication system (described later) including base station 100 and terminal 200 performs communication using an uplink component band and a plurality of downlink component bands associated with the uplink component band, that is, communication using asymmetric carrier aggregation specific to terminal 200. Furthermore, this communication system also includes terminals that have no capability of performing communication using carrier aggregation unlike terminal 200 and perform communication using one downlink component band and one uplink component band associated therewith (that is, communication without using carrier aggregation).

Therefore, base station 100 is configured to be able to support both communication using asymmetric carrier aggregation and communication without using carrier aggregation.

Furthermore, communication without using carrier aggregation can also be performed between base station 100 and terminal 200 depending on resource assignment to terminal 200 by base station 100.

Furthermore, this communication system performs conventional ARQ when performing communication without using carrier aggregation on one hand, and adopts channel selection in ARQ when performing communication using carrier aggregation on the other. That is, this communication system is, for example, an LTE-A system, base station 100 is, for example, an LTE-A base station and terminal 200 is, for example, an LTE-A terminal. Furthermore, the terminal having no capability of performing communication using carrier aggregation is, for example, an LTE terminal.

Descriptions will be given below assuming the following matters as premises. That is, asymmetric carrier aggregation specific to terminal 200 is configured beforehand between base station 100 and terminal 200 and information of downlink component bands and uplink component bands to be used by terminal 200 is shared between base station 100 and terminal 200.

[Configuration of Base Station]

Figure 6:
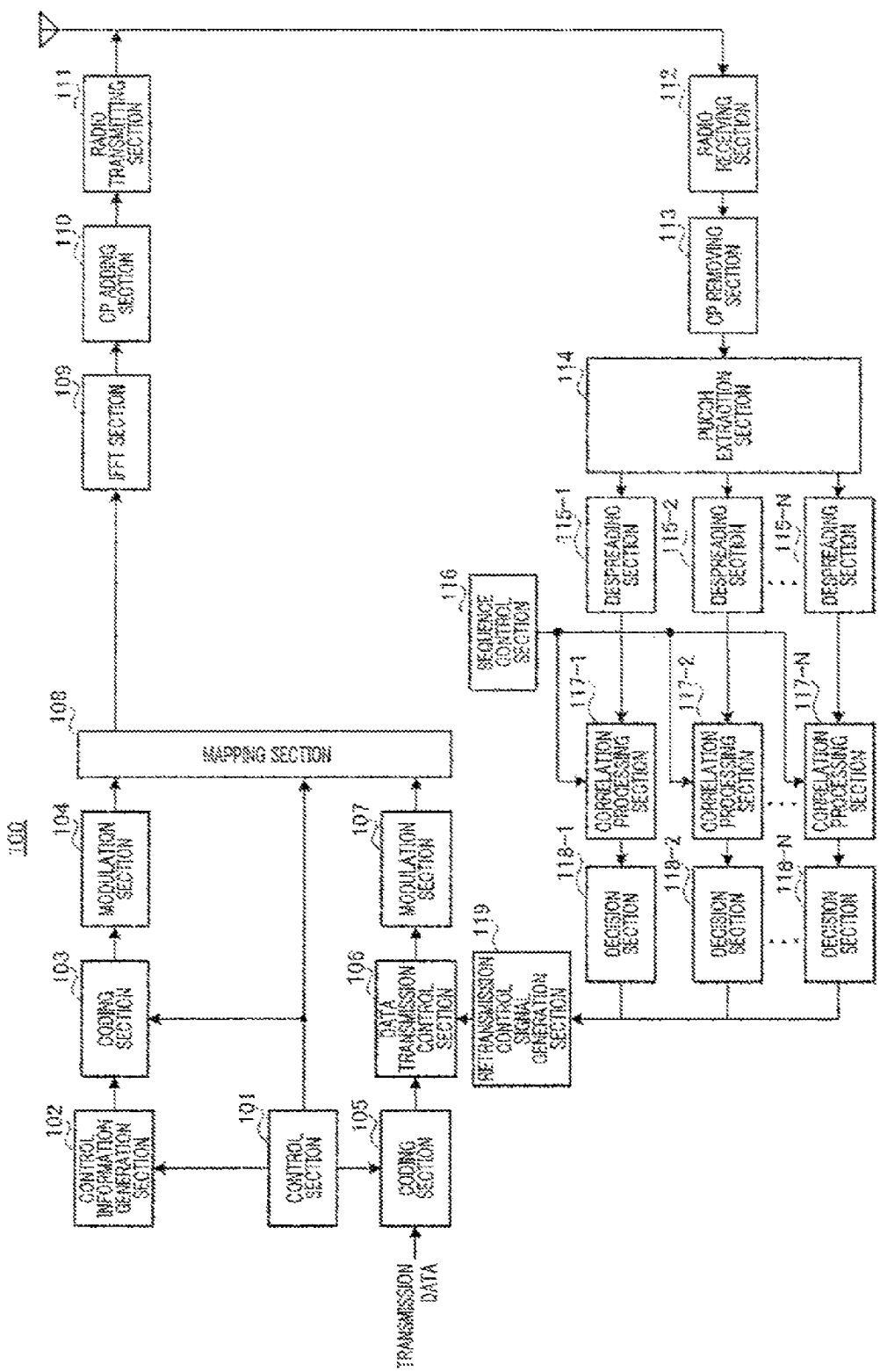
FIG. 6 is a block diagram illustrating a configuration of a base station according to Embodiment 1 of the present invention.

FIG. 6 is a block diagram illustrating a configuration of base station 100 according to Embodiment 1 of the present invention. In FIG. 6, base station 100 includes control section 101, control information generation section 102, coding section 103, modulation section 104, coding section 105, data transmission control section 106, modulation section 107, mapping section 108, IFFT section 109, CP adding section 110, radio transmitting section 111, radio receiving section 112, CP removing section 113, PUCCH extraction section 114, despreading section 115, sequence control section 116, correlation processing section 117, decision section 118, and retransmission control signal generation section 119.

Control section 101 allocates (assigns), to resource assignment target terminal 200, downlink resources to transmit control information (that is, downlink control information assignment resources) and downlink resources to transmit downlink data (that is, downlink data assignment resources). Such resources are assigned in downlink component bands included in a component band group set in resource assignment target terminal 200. Furthermore, the downlink control information assignment resources are selected from among resources corresponding to a downlink control channel (PDCCH) in each downlink component band. Furthermore, the downlink data assignment resources are selected from among resources corresponding to a downlink data channel (PDSCH) in each downlink component band. Furthermore, when there are a plurality of resource assignment target terminals 200, control section 101 assigns different resources to respective resource assignment target terminals 200.

The downlink control information assignment resources are equivalent to above-described L1/L2 CCHs. That is, each of the downlink control information assignment resources is made up of one or a plurality of CCEs. Furthermore, each CCE in a downlink component band is associated with a constituent resource in an uplink control channel region (PUCCH region) in an uplink component band in the component band group on a one-by-one basis. That is, each CCE in each downlink component band N is associated with a constituent resource in a PUCCH region N in an uplink component band in the component band group on a one-by-one basis.

Furthermore, control section 101 determines a coding rate used to transmit control information to resource assignment target terminal 200. Since the amount of data of the control information differs according to this coding rate, control section 101 assigns downlink control information assignment resources having a number of CCEs to which control information corresponding to this amount of data is mapped.

Control section 101 then outputs information on the downlink data assignment resources to control information generation section 102. Furthermore, control section 101 outputs information on a coding rate to coding section 103. Furthermore, control section 101 determines a coding rate of transmission data (that is, downlink data) and outputs the coding rate to coding section 105. Furthermore, control section 101 outputs information on downlink data assignment resources and downlink control information assignment resources to mapping section 108. However, control section 101 performs control so as to map downlink data and downlink control information for the downlink data to the same downlink component band.

Control information generation section 102 generates control information including information on downlink data assignment resources and outputs the result coding section 103. The control information is generated for each downlink component band. Furthermore, when there are a plurality of resource assignment target terminals 200, the control information includes a terminal ID of a destination terminal to distinguish between resource assignment target terminals 200. For example, the control information includes a CRC bit masked with a terminal ID of the destination terminal. This control information may be called "downlink assignment control information."

Coding section 103 codes control information according to the coding rate received from control section 101 and outputs the coded control information to modulation section 104.

Modulation section 104 modulates the coded control information and outputs the modulated signal obtained to mapping section 108.

Coding section 105 receives transmission data per destination terminal 200 (that is, downlink data) and coding rate information from control section 101 as input, codes transmission data and outputs the coded transmission data to data transmission control section 106. However, when a plurality of downlink component bands are assigned to destination terminal 200, transmission data transmitted in each downlink component band is coded and the coded transmission data is outputted to data transmission control section 106.

Upon initial transmission, data transmission control section 106 stores the coded transmission data and also outputs the coded transmission data to modulation section 107. The coded transmission data is stored for each destination terminal 200. Furthermore, transmission data for one destination terminal 200 is stored for each downlink component band transmitted. This enables not only retransmission control over the entire data transmitted to destination terminal 200 but also retransmission control over each downlink component band.

Furthermore, upon receiving NACK or DTX for downlink data transmitted in a certain downlink component band from retransmission control signal generation section 119, data transmission control section 106 outputs the stored data corresponding to this downlink component band to modulation section 107. Upon receiving ACK for downlink data transmitted in a certain downlink component band from retransmission control signal generation section 119, data transmission control section 106 deletes the stored data corresponding to this downlink component band.

Modulation section 107 modulates the coded transmission data received from data transmission control section 106 and outputs the modulated signal to mapping section 108.

Mapping section 108 maps the modulated signal of the control information received from modulation section 104 to resources indicated by the downlink control information assignment resources and outputs the mapping result to IFFT section 109.

Furthermore, mapping section 108 maps the modulated signal of the transmission data received from modulation section 107 to resources indicated by the downlink data assignment resources received from control section 101 and outputs the mapping result to IFFT section 109.

The control information and the transmission data mapped by mapping section 108 to a plurality of subcarriers in a plurality of downlink component bands are transformed by IFFT section 109 from a frequency domain signal into a time domain signal, transformed into an OFDM signal with a CP added by CP adding section 110, subjected to transmission processing such as D/A conversion, amplification and up-conversion in radio transmitting section 111, and transmitted to terminal 200 via an antenna.

Radio receiving section 112 receives a response signal or reference signal transmitted from terminal 200 via the antenna and performs reception processing such as down-conversion and A/D conversion on the response signal or reference signal.

CP removing section 113 removes a CP added to the response signal or reference signal after the reception processing.

PUCCH extraction section 114 extracts an uplink control channel signal included in the received signal for each PUCCH region and distributes the extracted signals. This uplink control channel signal may include a response signal and a reference signal transmitted from terminal 200.

Despreading section 115-N, correlation processing section 117-N, and decision section 118-N perform processing on the uplink control channel signal extracted in PUCCH region N. Base station 100 is provided with processing systems of despreading sections 115, correlation processing sections 117, and decision sections 118 corresponding to respective PUCCH regions 1 to N used by base station 100.

To be more specific, despreading section 115 despreads a signal corresponding to a response signal with an orthogonal code sequence for terminal 200 to use for secondary-spreading in the respective PUCCH regions and outputs the despread signal to correlation processing section 117. Furthermore, despreading section 115 despreads a signal corresponding to the reference signal with an orthogonal code sequence for terminal 200 to use to spread the reference signal in the respective uplink component bands and outputs the despread signal to correlation processing section 117.

Sequence control section 116 generates a ZAC sequence that may be possibly used to spread a response signal and reference signal transmitted from terminal 200. Furthermore, sequence control section 116 identifies a correlation window where signal components from terminal 200 should be included in PUCCH regions 1 to N respectively based on code resources (e.g. cyclic shift value) that may be possibly used by terminal 200. Sequence control section 116 then outputs the information indicating the identified correlation window and the generated ZAC sequence to correlation processing section 117.

Correlation processing section 117 obtains a correlation value between the signal inputted from despreading section 115 and the ZAC sequence that may be possibly used for primary spreading in terminal 200 using the information indicating the correlation window inputted from sequence control section 116 and the ZAC sequence and outputs the correlation value to decision section 118.

Decision section 118 decides whether the response signal transmitted from the terminal indicates ACK or NACK (or DTX) with respect to the data transmitted in respective downlink component bands based on the correlation value inputted from correlation processing section 117. That is, decision section 118 decides that terminal 200 is transmitting neither ACK nor NACK using the resources when the magnitude of the correlation value inputted from correlation processing section 117 is equal to or below a certain threshold, and further decides through coherent detection which phase point the response signal indicates when the magnitude of the correlation value is equal to or greater than the threshold. Decision section 118 then outputs the decision result in each PUCCH region to retransmission control signal generation section 119.

Retransmission control signal generation section 119 generates a retransmission control signal based on the number of downlink component bands where the base station transmits downlink assignment control information and downlink data to terminal 200, resource identification information where a response signal transmitted from terminal 200 is detected, and a phase point of the response signal. Specifically, retransmission control signal generation section 119 stores information about how many downlink component bands base station 100 uses to transmit downlink assignment control information and downlink data to terminal 200. Retransmission control signal generation section 119 decides whether or not the data transmitted in each downlink component band should be retransmitted, on the basis of the stored information, information inputted from decision section 118, and an interpretation rule table (described later), and generates a retransmission control signal based on the decision result.

Specifically, first, retransmission control signal generation section 119 decides that a maximum correlation value is detected where PUCCH region corresponding to decision sections 118-1 to 118-N. Next, retransmission control signal generation section 119 identifies a phase point of the response signal transmitted in the PUCCH region at which the maximum correlation value is detected, and identifies a reception state pattern corresponding to the PUCCH region, the identified phase point, and the number of downlink component bands where the base station transmits downlink data to terminal 200. Then, retransmission control signal generation section 119 individually generates an ACK signal or a NACK signal for data transmitted data in each downlink component band, on the basis of the identified reception state pattern, and outputs the results to data transmission control section 106. However, when all the correlation values detected in each PUCCH region are equal to or below a certain threshold, retransmission control signal generation section 119 decides that no response signal is transmitted from terminal 200, generates DTX for all downlink data, and outputs the DTX to data transmission control section 106.

Details of the processing of decision section 118 and retransmission control signal generation section 119 will be described later.

[Configuration of Terminal]

Figure 7:
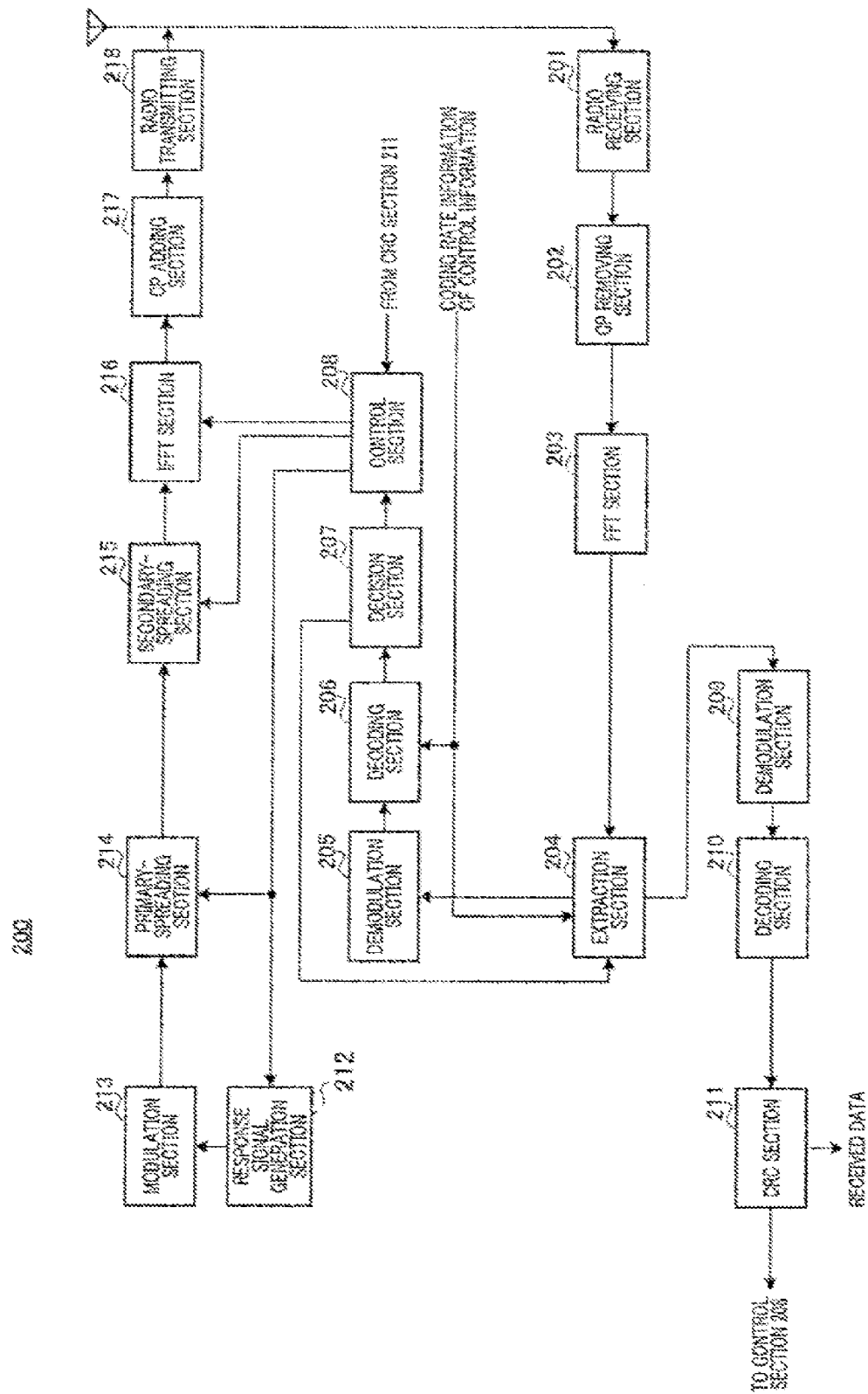
FIG. 7 is a block diagram illustrating a configuration of a terminal according to Embodiment 1 of the present invention.

FIG. 7 is a block diagram illustrating a configuration of terminal 200 according to Embodiment 1 of the present invention. In FIG. 7, terminal 200 includes radio receiving section 201, CP removing section 202, FFT section 203, extraction section 204, demodulation section 205, decoding section 206, decision section 207, control section 208, demodulation section 209, decoding section 210, CRC section 211, response signal generation section 212, modulation section 213, primary-spreading section 214, secondary-spreading section 215, IFFT section 216, CP adding section 217, and radio transmitting section 218.

Radio receiving section 201 receives an OFDM signal transmitted from base station 100 via an antenna and performs reception processing such as down-conversion, A/D conversion on the received OFDM signal.

CP removing section 202 removes a CP added to the OFDM signal after the reception processing.

FFT section 203 applies FFT to the received OFDM signal, transforms the OFDM signal into a frequency domain signal and outputs the received signal obtained to extraction section 204.

Extraction section 204 extracts a downlink control channel signal (PDCCH signal) from the received signal received from FFT section 203 according to the inputted coding rate information. That is, since the number of CCEs making up downlink control information assignment resources changes according to the coding rate, extraction section 204 extracts a downlink control channel signal using a number of CCEs corresponding to the coding rate as an extraction unit. Furthermore, the downlink control channel signal is extracted for each downlink component band. The extracted downlink control channel signal is outputted to demodulation section 205.

Furthermore, extraction section 204 extracts downlink data from the received signal based on the information on the downlink data assignment resources directed to the terminal received from decision section 207 and outputs the downlink data to demodulation section 209.

Demodulation section 205 demodulates the downlink control channel signal received from extraction section 204 and outputs the demodulation result obtained to decoding section 206.

Decoding section 206 decodes the demodulation result received from demodulation section 205 according to the coding rate information inputted and outputs the decoding result obtained to decision section 207.

Decision section 207 performs a blind decision as to whether or not the control information included in the decoding result received from decoding section 206 is control information directed to the terminal. This decision is made based on the unit of the decoding result with respect to the above-described extraction unit. For example, decision section 207 demasks the CRC bit with the terminal ID of the terminal and decides that control information with CRC=OK (no error) is control information directed to the terminal. Decision section 207 then outputs information on the downlink data assignment resources for the terminal included in the control information directed to the terminal to extraction section 204.

Furthermore, on downlink control channels of each base component band, decision section 207 identifies CCEs to which the above-described control information directed to the terminal is mapped and outputs identification information of the identified CCEs to control section 208.

Based on CCE identification information received from decision section 207, control section 208 identifies PUCCH resources (frequency, code) corresponding to a CCE to which downlink control information received in Nth component band is mapped, that is, "PUCCH resource N" in PUCCH region N.

Control section 208 then performs transmission control over a response signal based on the error detection result received from CRC section 211. Control section 208 transmits a response signal using one of response signal transmission rules (described later) illustrated in FIGS. 8 to 10, on the basis of a pattern of downlink component bands where downlink assignment control information directed to the terminal is detected and a pattern of error detection result of downlink data corresponding to the downlink assignment control information (that is, a pattern of reception success/failure).

Specifically, control section 208 determines which "PUCCH resource N" is used and which phase point is set to transmit a signal by using a transmission rule table, on the basis of the condition of success/failure in reception of the downlink data in each downlink component band inputted from CRC section 211. Control section 208 then outputs information on the phase point to be set to response signal generation section 212, outputs the ZAC sequence and cyclic shift value corresponding to the PUCCH resources to be used to primary-spreading section 214 and outputs frequency resource information to IFFT section 216. Furthermore, control section 208 outputs an orthogonal code sequence corresponding to the PUCCH resources to be used to secondary-spreading section 215. Details of control over PUCCH resources and phase points by control section 208 will be described later.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

CRC section 211 generates the decoded downlink data received from decoding section 210, performs error detection for each downlink component band using a CRC and outputs ACK when CRC=OK (no error) and NACK when CRC=NG (error present) to control section 208. Furthermore, when CRC=OK (no error), CRC section 211 outputs the decoded downlink data as the received data.

Response signal generation section 212 generates a response signal and reference signal based on the phase points of the response signal instructed from control section 208 and outputs the response signal and reference signal to modulation section 213.

Modulation section 213 modulates the response signal and reference signal inputted from response signal generation section 212 and outputs the results to primary-spreading section 214.

Primary-spreading section 214 primary-spreads the response signal and reference signal based on the ZAC sequence and cyclic shift value set by control section 208 and outputs the primary-spread response signal and reference signal to secondary-spreading section 215. That is, primary-spreading section 214 primary-spreads the response signal and reference signal according to the instruction from control section 208.

Secondary-spreading section 215 secondary-spreads the response signal and reference signal using an orthogonal code sequence set by control section 208 and outputs the secondary-spread signal to IFFT section 216. That is, secondary-spreading section 215 secondary-spreads the primary-spread response signal and reference signal using an orthogonal code sequence corresponding to the PUCCH resources selected by control section 208 and outputs the spread signal to IFFT section 216.

CP adding section 217 adds the same signal as that of the rear part of the signal after the IFFT at the head of the signal as a CP.

Radio transmitting section 218 performs transmission processing such as D/A conversion, amplification and up-conversion on the signal inputted. Radio transmitting section 218 then transmits the signal to base station 100 from the antenna.

[Operation of Base Station 100 and Terminal 200]

Figure 4:
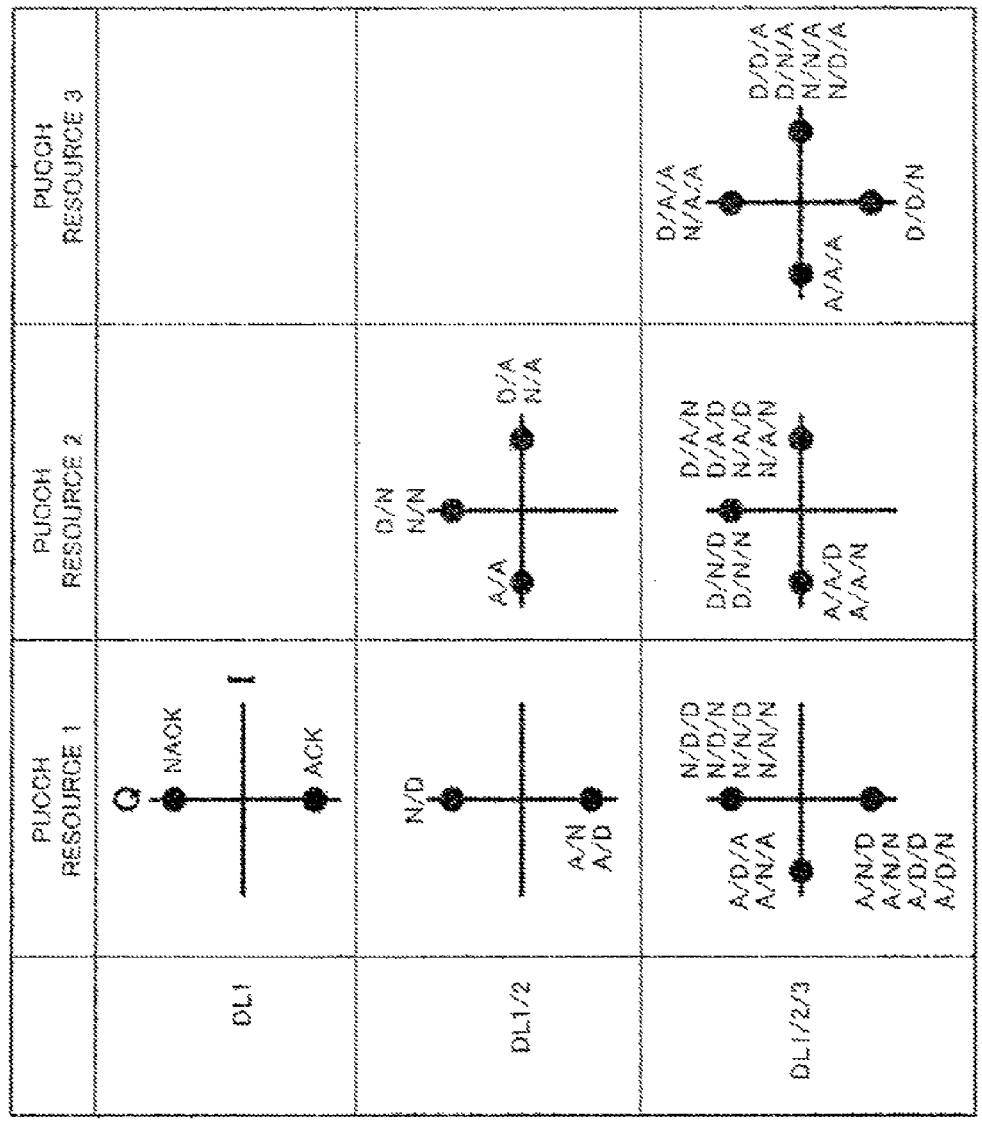
FIG. 4 illustrates a relationship between a resource used by a terminal to transmit a response signal and a component band number where the terminal receives downlink assignment control information, when DAI (Downlink Assignment Indicator) is applied to channel selection while carrier aggregation is performed.
Figure 5:
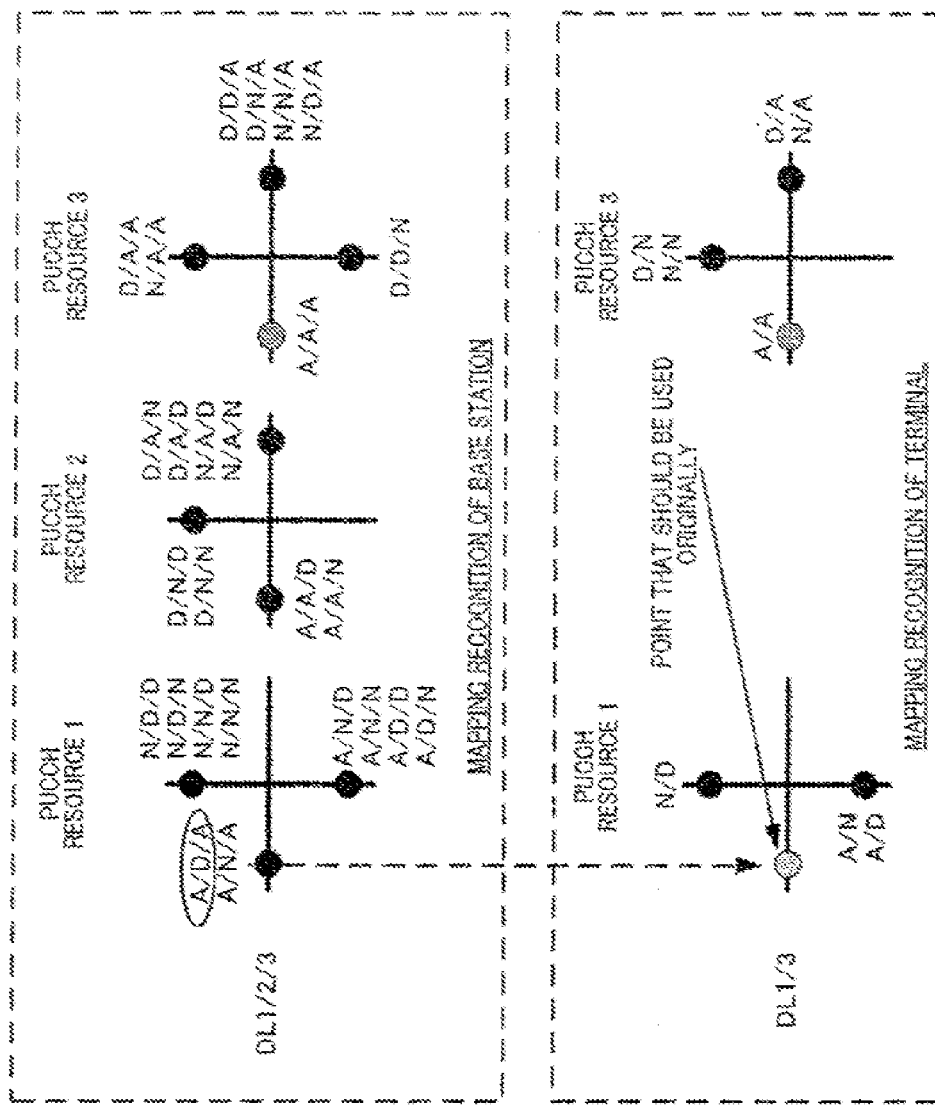
FIGS. 5A and 5B are conceptual diagrams of a case where a base station transmits downlink assignment control information and data to a terminal in downlink component bands 1, 2, and 3, and on the other hand, the terminal successfully receives downlink assignment control information only in downlink component bands 1 and 3.

Operations of base station 100 and terminal 200 having the above-described configurations will be described. In the description below, in the same manner as FIG. 4, a response signal resource associated with downlink control information assignment resource used for downlink assignment control information for downlink data transmitted in downlink component band 1 is defined as PUCCH resource 1; a response signal resource associated with downlink control information assignment resource used for downlink assignment control information for downlink data transmitted in downlink component band 2 is defined as PUCCH resource 2; and a response signal resource associated with downlink control information assignment resource used for downlink assignment control information for downlink data transmitted in downlink component band 3 is defined as PUCCH resource 3.

<Transmission of Downlink Assignment Control Information and Downlink Data by Base Station 100>

Base station 100 can select at least one downlink component band from a group of downlink component bands included in a component band group configured for terminal 200 in advance, and transmit downlink assignment control information (and downlink data) using the selected downlink component band. Here, downlink component bands 1 to 3 are included in the component band group, so that base station 100 can select up to three downlink component bands. Furthermore, base station 100 can select different downlink component bands for each subframe. That is, if downlink component bands 1, 2, and 3 are configured for terminal 200 in advance, base station 100 can transmit downlink assignment control information to terminal 200 using downlink component bands 1 and 3 in a certain subframe, and transmit downlink assignment control information using all downlink component bands 1 to 3 in the next subframe.

<Reception of Downlink Assignment Control Information and Downlink Data by Terminal 200>

Terminal 200 performs a blind decision whether or not downlink assignment control information directed to the terminal is transmitted for each subframe in all the downlink component bands of the component band group set for the terminal.

Specifically, decision section 207 decides whether or not downlink assignment control information directed to the terminal is included in a downlink control channel of each downlink component band. If decision section 207 decides that downlink assignment control information directed to the terminal is included, decision section 207 outputs the downlink assignment control information to extraction section 204. Furthermore, decision section 207 outputs identification information of the downlink component band where the downlink assignment control information directed to the terminal is detected, to control section 208. Thereby, control section 208 is notified where downlink component band the downlink assignment control information directed to the terminal is detected.

Extraction section 204 extracts downlink data from the received signal, based on the downlink assignment control information received from decision section 207. Extraction section 204 extracts the downlink data from the received signal, on the basis of resource information included in the downlink assignment control information.

Specifically, the downlink assignment control information transmitted in downlink component band 1 includes information on resources used to transmit downlink data (DL data) transmitted in downlink component band 1; and the downlink assignment control information transmitted in downlink component band 2 includes information on resources used to transmit downlink data transmitted in downlink component band 2.

Therefore, by receiving downlink assignment control information transmitted in downlink component band 1 and downlink assignment control information transmitted in downlink component band 2, terminal 200 can receive downlink data in both downlink component bands 1 and 2. On the contrary, when the terminal cannot receive downlink assignment control information in a certain downlink component band, terminal 200 cannot receive downlink data in the downlink component band.

<Response by terminal 200>

CRC section 211 performs error detection on downlink data corresponding to the downlink assignment control information that has been successfully received and outputs the error detection result to control section 208.

Figure 8:
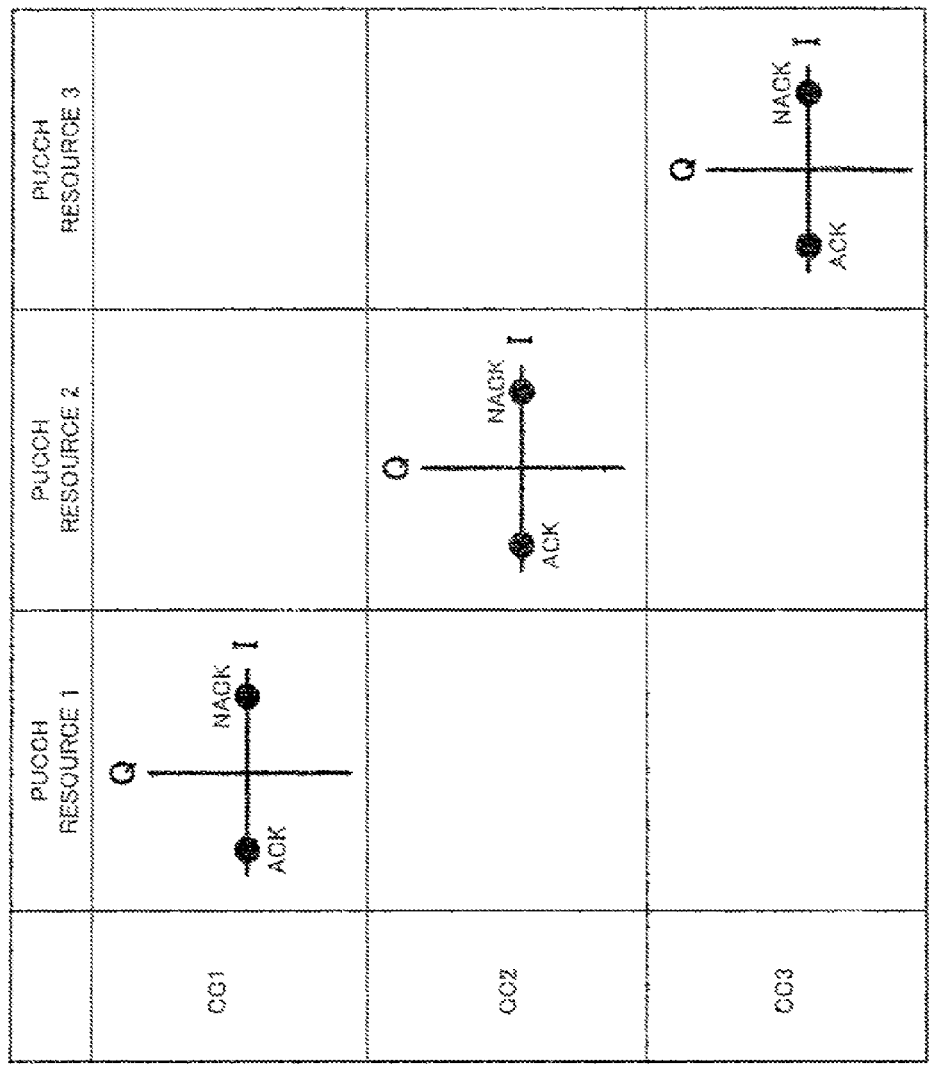
FIG. 8 illustrates a transmission method of a response signal by the terminal.
Figure 9:
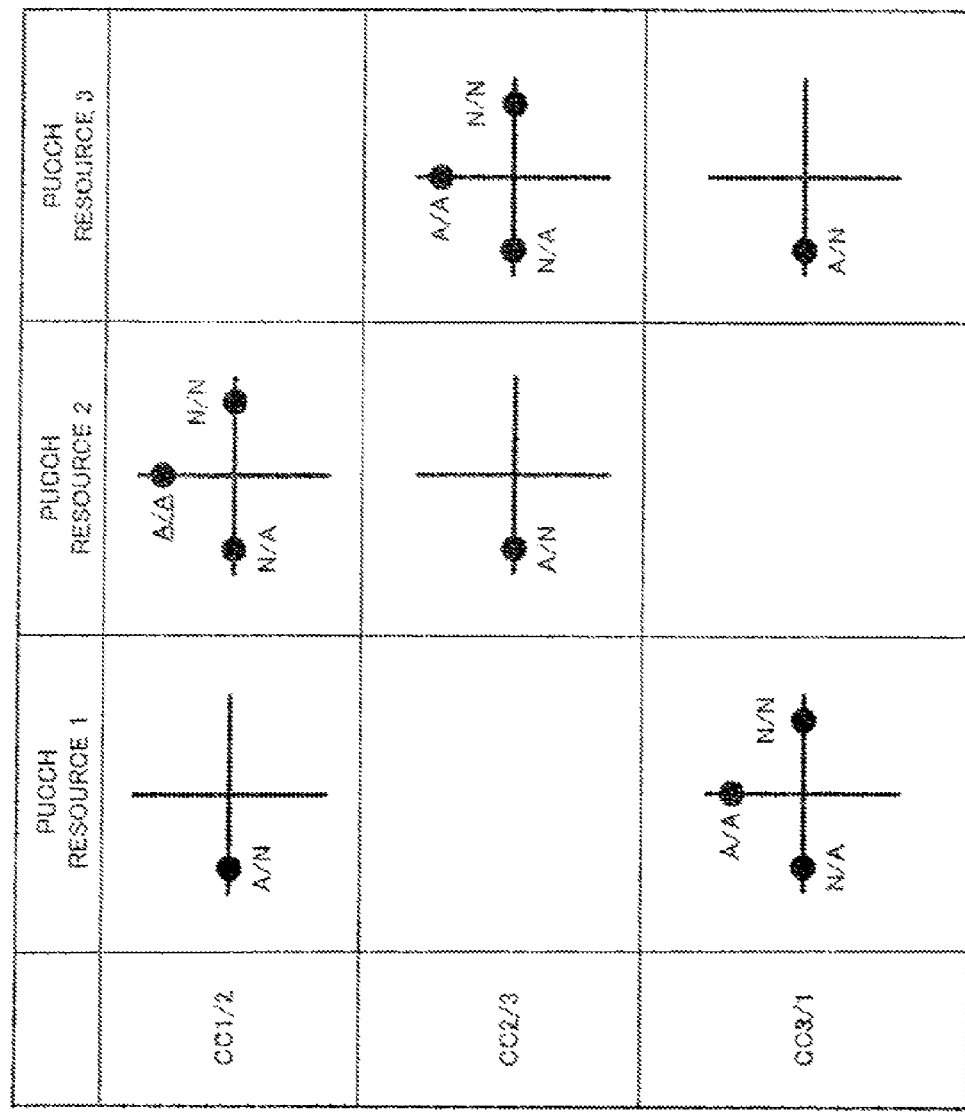
FIG. 9 illustrates a transmission method of a response signal by the terminal.
Figure 10:
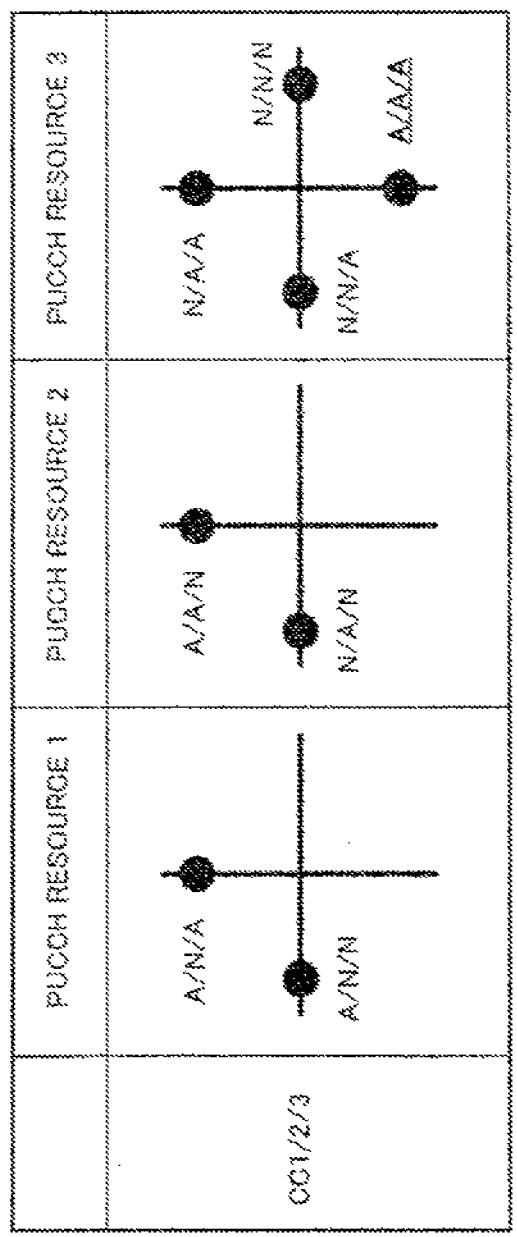
FIG. 10 illustrates a transmission method of a response signal by the terminal.

Control section 208 then performs transmission control over a response signal based on the error detection result received from CRC section 211 as follows. FIGS. 8 to 10 illustrate a method for transmitting a response signal by terminal 200. Here, it should be noted that a "DTX" condition is illustrated in FIGS. 8 to 10. This is because DAI is not included in downlink assignment control information transmitted from base station 100 to terminal 200, so that the terminal cannot recognize a reception error of the downlink assignment control information.

Control section 208 transmit a response signal using one of the response signal transmission rules illustrated in FIGS. 8 to 10, on the basis of a pattern of downlink component bands where downlink assignment control information directed to the terminal is detected and a pattern of reception success/failure of downlink data corresponding to the downlink assignment control information.

Specifically, control section 208 first selects a response signal transmission rule table, based on the number of downlink component bands where downlink assignment control information directed to the terminal is detected. The transmission rule table illustrated in FIG. 8 is selected when the number of downlink component bands where downlink assignment control information directed to the terminal is detected is one; and the transmission rule table illustrated in FIG. 9 is selected when the number is two; and the transmission rule table illustrated in FIG. 10 is selected when the number is three. Each of the transmission rule tables illustrated in FIGS. 8 to 10 illustrates response signal transmission resources and phase points used for the response signal, corresponding to each combination of a pattern candidate of: downlink component bands where downlink assignment control information directed to the terminal is detected; and a pattern candidate of reception success/failure of downlink data corresponding to the downlink assignment control information.

Control section 208 identifies a transmission resource to be used and a phase point to be used in the selected rule table, corresponding to a pattern: of the downlink component bands where downlink assignment control information directed to the terminal is detected; and a pattern of reception success/failure of downlink data corresponding to the downlink assignment control information. Control section 208 controls a response signal of the phase point to be used is transmitted so as to be transmitted by the transmission resource to be used.

Here, the rules illustrated in the transmission rule tables of FIGS. 8 to 10 will be described. First, FIG. 8 is a transmission rule table used when the number of downlink component bands where downlink assignment control information directed to the terminal is detected is one. In FIG. 8, when downlink data corresponding to the detected downlink assignment control information is successfully received, a phase point (−1, 0) is assigned. In other words, ACK is associated with the phase point (−1, 0). On the other hand, when downlink data corresponding to the detected downlink assignment control information is not successfully received, a phase point (1, 0) is used. In other words, NACK is associated with the phase point (1, 0). As a transmission resource to be used, a PUCCH resource associated with a CCE occupied by the detected downlink assignment control information is used.

FIG. 9 is a transmission rule table used when the number of downlink component bands where downlink assignment control information directed to the terminal is detected is two. In FIG. 9, when downlink data corresponding to the two pieces of detected downlink assignment control information are both successfully received, a phase point (0, j) is used. In other words, ACK/ACK is associated with the phase point (0, j). When only one of downlink data corresponding to the two pieces of detected downlink assignment control information is successfully received, a phase point (−1, 0) is used. In other words, ACK/NACK and NACK/ACK are associated with the phase point (−1, 0). When neither of downlink data corresponding to the two pieces of detected downlink assignment control information are successfully received, a phase point (1, 0) is used. In other words, NACK/NACK is associated with the phase point (1, 0).

On the other hand, the transmission resource to be used has the following rules. First, as a basic rule, a PUCCH resource associated with a CCE occupied by the detected downlink assignment control information is used (rule 1). Next, when only one of downlink data corresponding to the two pieces of detected downlink assignment control information is successfully received, a PUCCH resource associated with a CCE occupied by the downlink assignment control information corresponding to the successfully received downlink data is used (rule 2). Thereby, there are two patterns when only one of downlink data corresponding to the two pieces of detected downlink assignment control information is successfully received, and the phase point (−1, 0) is used in both patterns. However, it is possible to identify both patterns from each other by differentiating the transmission resource to be used between both patterns. Next, for ACK/ACK and NACK/NACK, different PUCCH resources are used between the patterns of downlink component bands where downlink assignment control information directed to the terminal is detected (rule 3). Here, a PUCCH resource corresponding to a downlink component band having a larger identification number among the downlink component bands where downlink assignment control information directed to the terminal is detected is defined as the transmission resource to be used for ACK/ACK and NACK/NACK. When the downlink component bands where downlink assignment control information directed to the terminal is detected is the component bands 1 and 3 (that is, the case of CC3/1), PUCCH resource 1 corresponding to the component band 1 is used.

FIG. 10 is a transmission rule table used when the number of downlink component bands where downlink assignment control information directed to the terminal is detected is three. In FIG. 10, when downlink data corresponding to three pieces of detected downlink assignment control information are all successfully received, a phase point (0, −j) is used. In other words, ACK/ACK/ACK is associated with the phase point (0, −j). When only two of downlink data corresponding to three pieces of the detected downlink assignment control information are successfully received, a phase point (0, j) is used. In other words, ACK/NACK/ACK, ACK/ACK/NACK, and NACK/ACK/ACK are associated with the phase point (0, j). When only one of downlink data corresponding to three pieces of detected downlink assignment control information is successfully received, a phase point (−1, 0) is used. In other words, ACK/NACK/NACK, NACK/ACK/NACK, and NACK/NACK/ACK are associated with the phase point (−1, 0). When neither of downlink data corresponding to three pieces of detected downlink assignment control information are successfully received, a phase point (1, 0) is used. In other words, NACK/NACK/NACK is associated with the phase point (1, 0).

On the other hand, the transmission resource to be used has the following rules. First, as a basic rule, a PUCCH resource associated with a CCE occupied by the detected downlink assignment control information is used (rule 1). Next, when only one of downlink data corresponding to three pieces of detected downlink assignment control information is successfully received, a PUCCH resource associated with a CCE occupied by the downlink assignment control information corresponding to the successfully received downlink data is used (rule 2). Next, when only two of downlink data corresponding to three pieces of detected downlink assignment control information are successfully received, different PUCCH resources are used between the patterns of the downlink component bands where downlink data is successfully received (rule 3). Here, a PUCCH resource corresponding to a downlink component band having a larger identification number among the downlink component bands where downlink data is successfully received is defined as the transmission resource to be used for ACK/NACK/ACK ACK/ACK/NACK, and NACK/ACK/ACK. When downlink data is not successfully received in downlink component band 2, that is, in the case of ACK/NACK/ACK, PUCCH resource 1 corresponding to the component band 1 is used. Next, a predetermined PUCCH resource is used for ACK/ACK/ACK and NACK/NACK/NACK (rule 4). Here, PUCCH resource 3 is used which corresponds to the component band 3 having a larger identification number among the downlink component bands where downlink data is successfully received.

In summary, the rules described above have the following features.

First, regardless of the pattern of the downlink component bands where downlink assignment control information directed to the terminal is detected, that is, regardless of the number of the downlink component bands where downlink assignment control information directed to the terminal is detected, a different signal point is used according to the number of downlink data (that is, the number of ACKs) that are received successfully and the same signal point is used when the number of downlink data that are received successfully is the same (feature 1). Specifically, in the transmission rule table, a pattern candidate of error detection result is associated with a phase point of the response signal, the group of pattern candidates where the numbers of ACKs included in a pattern are different is associated with phase points different from each other, and the group of pattern candidates where the numbers of ACKs included in a pattern are the same are associated with the same phase point. Thereby, even when all downlink data corresponding to the detected downlink assignment control information are successfully received, if the number of downlink data that are successfully received is different, a different phase point is used. Here, the phase point (−1, 0) is used when the number of downlink data that are successfully received is one (ACK, ACK/NACK, NACK/ACK, ACK/NACK/NACK, NACK/ACK/NACK, NACK/NACK/ACK); the phase point (0, j) is used when the number of downlink data that are successfully received is two (ACK/ACK, NACK/ACK/ACK, ACK/NACK/ACK, ACK/ACK/NACK); and the phase point (0, −j) is used when the number of downlink data that are successfully received is three (ACK/ACK/ACK). The phase point (1, 0) is used when no downlink data is successfully received (NACK, NACK/NACK, and NACK/NACK/NACK). In other words, when all response signals are NACKs, the same phase point (1, 0) is used, regardless of the number of downlink component bands where downlink assignment control information directed to the terminal is detected.

When the number of downlink data that is successfully received is one, a PUCCH resource associated with a CCE occupied by downlink assignment control information for the downlink data is used (feature 2).

When the number of downlink data that are successfully received equals or exceeds two (except for the case where all downlink data corresponding to a plurality of pieces of the detected downlink assignment control information are successfully received), different PUCCH resources are used among the patterns (combinations) of the downlink component bands where downlink data is successfully received (feature 3). Specifically, in the transmission rule table, a pattern candidate of error detection result is associated with a resource of an uplink control channel to which the response signal is mapped, and the group of pattern candidates where the number of ACKs is the same is associated with resources different from each other.

<Retransmission Control by Base Station 100>

Figure 11:
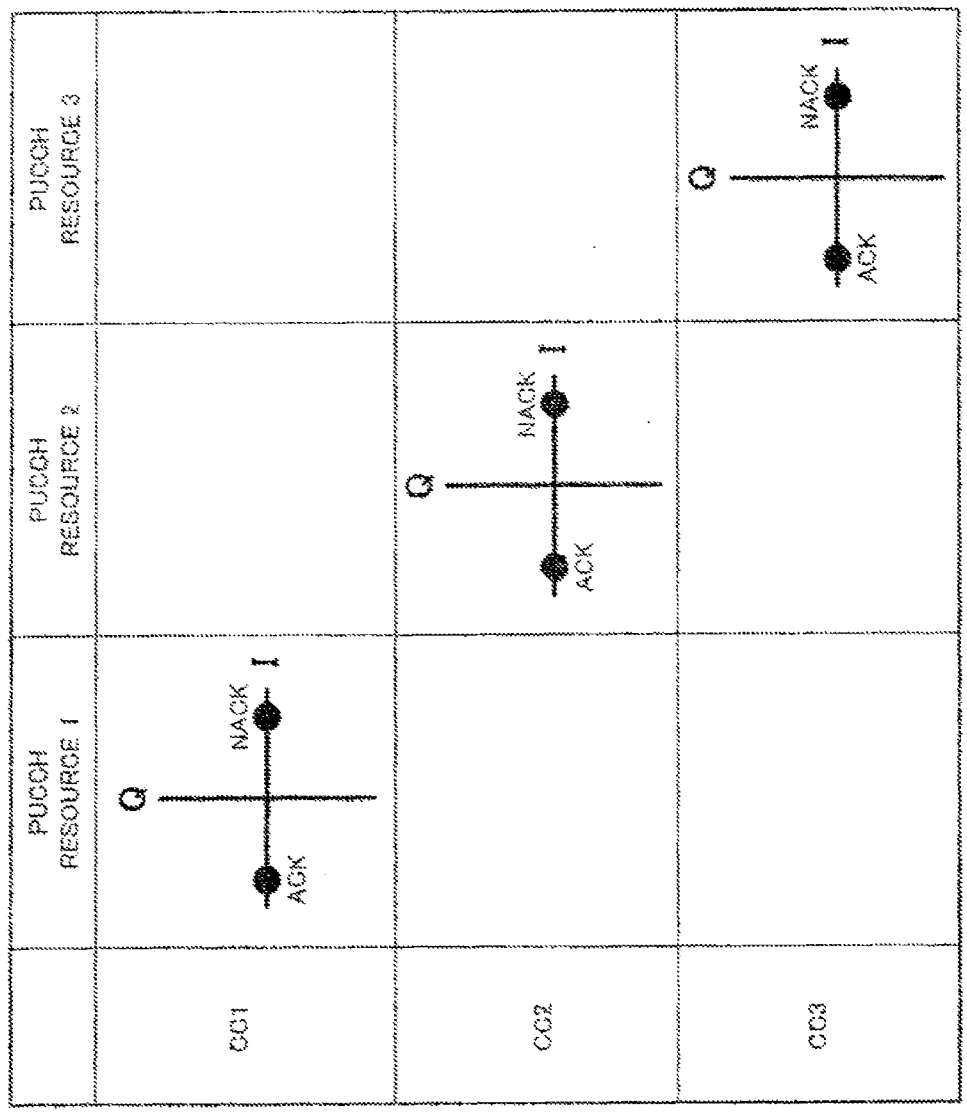
FIG. 11 illustrates a retransmission control method by the base station.
Figure 12:
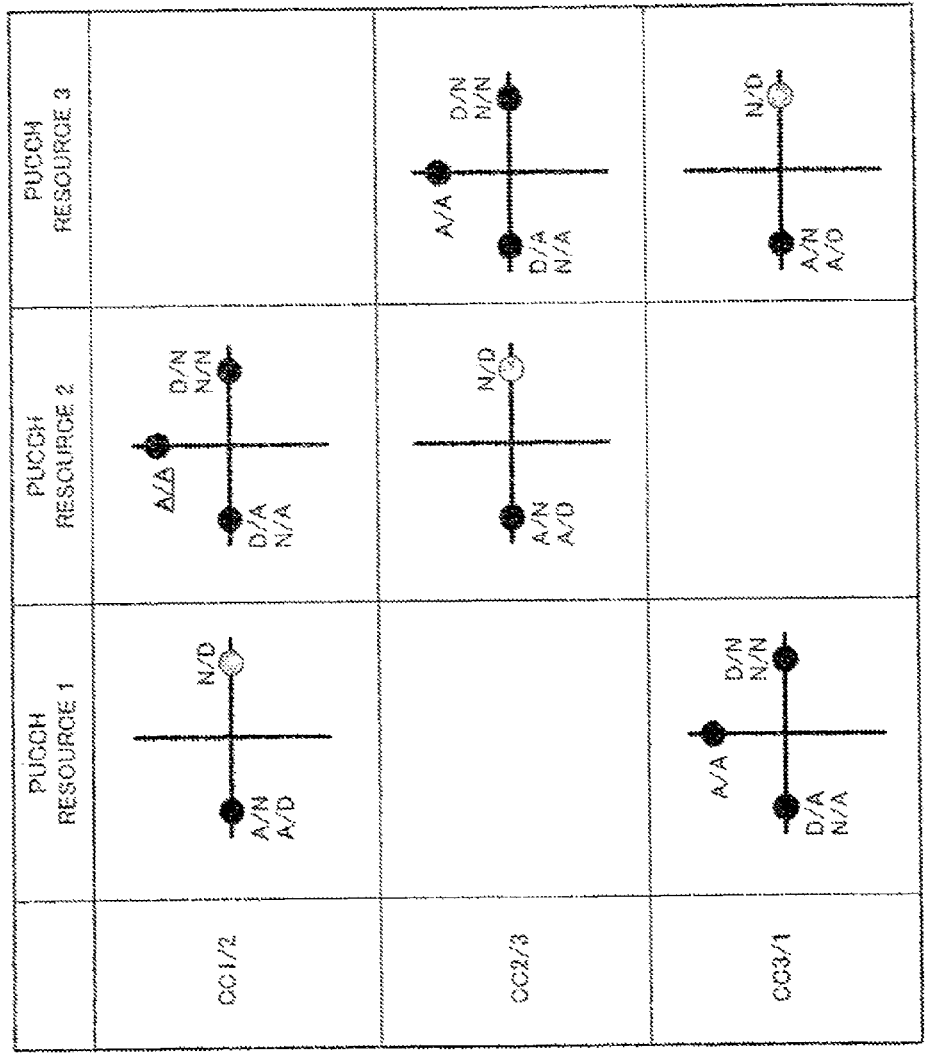
FIG. 12 illustrates a retransmission control method by the base station.
Figure 13:
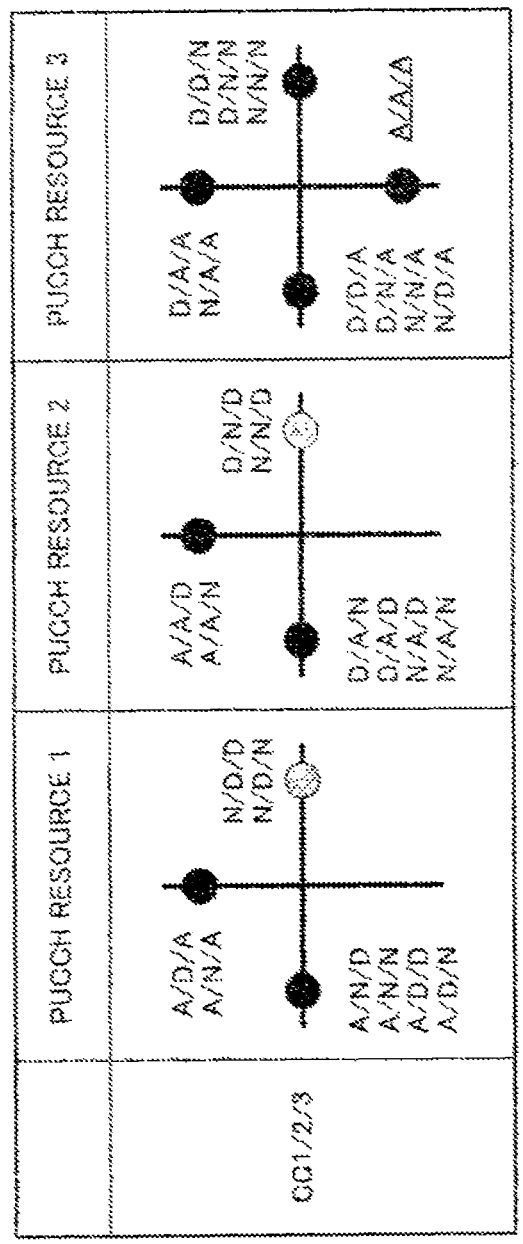
FIG. 13 illustrates a retransmission control method by the base station.

Retransmission control signal generation section 119 generates a retransmission control signal as described below on the basis of the response signal from terminal 200 and outputs the result to data transmission control section 106. FIGS. 11 to 13 illustrate a retransmission control method by base station 100.

That is, retransmission control signal generation section 119 generates the retransmission control signal, based on the number of downlink component bands where the base station transmits downlink assignment control information and downlink data to terminal 200, resource identification information where the response signal transmitted from terminal 200 is detected, and a phase point of the response signal.

Specifically, first, retransmission control signal generation section 119 selects an interpretation rule table of the response signal, on the basis of the number of downlink component bands where the base station transmits downlink assignment control information and downlink data to terminal 200. The rule table illustrated in FIG. 11 is selected when the number of the downlink component bands is one; the interpretation rule table illustrated in FIG. 12 is selected when the number is two; and the interpretation rule table illustrated in FIG. 13 is selected when the number is three. Each of the interpretation rule tables illustrated in FIGS. 11 to 13 illustrates phase points that can be used for the response signal and reception success/failure conditions in terminal 200 that can be interpreted from the phase points. The phase points that can be used for the response signal and the reception success/failure conditions in terminal 200 that can be interpreted from the phase points are illustrated for each combination of: a pattern of downlink component bands where the base station transmits downlink assignment control information and downlink data to terminal 200; and a PUCCH resource where a response signal from terminal 200 is detected.

Retransmission control signal generation section 119 identifies a retransmission control pattern, on the basis of the pattern of downlink component bands where the base station transmits downlink assignment control information and downlink data to terminal 200, the PUCCH resource where a response signal is detected, and the phase point of the response signal by using the selected interpretation rule table. Retransmission control signal generation section 119 generates a retransmission control signal according to the identified retransmission control pattern.

Here, the rules illustrated in the interpretation rule tables of FIGS. 11 to 13 will be described. The basic configurations of the interpretation rule tables of FIGS. 11 to 13 correspond to those of the transmission rule tables illustrated in FIGS. 8 to 10. However, in the transmission rule tables illustrated in FIGS. 8 to 10, a phase point corresponding to a condition without any ACK is present only in one PUCCH resource in any pattern of component bands where downlink assignment control signal is detected. On the other hand, in the interpretation rule tables illustrated in FIGS. 11 to 13, a phase point corresponding to a condition without any ACK is present in all component bands where downlink assignment control signal is detected. For example, in a cell (1, 1) in the interpretation rule table of FIG. 11, there is a phase point (1, 0) that is not present in a cell (1, 1) in the transmission rule table of FIG. 8.

First, FIG. 11 is an interpretation rule table used when the number of downlink component bands where base station 100 transmits downlink assignment control information and downlink data to terminal 200 is one. In FIG. 11, the phase point (−1, 0) means ACK, and the phase point (1, 0) means NACK. By identifying the PUCCH resource where the response signal is detected, it is possible to identify the downlink component band where downlink data related to reception success/failure information in terminal 200 indicated by the response signal is transmitted. For example, if the response signal is detected in PUCCH resource 1, the response signal is interpreted to be a response signal for downlink data transmitted in the component band 1.

FIG. 12 is an interpretation rule table used when the number of downlink component bands where base station 100 transmits downlink assignment control information and downlink data to terminal 200 is two. In FIG. 12, the phase point (0, j) means that both receptions are successfully performed, that is, ACK/ACK.

Here, the cases of the phase point (−1, 0) and the phase point (1, 0) should be noted. As described above, when terminal 200 successfully receives only one of two downlink data transmitted in a certain subframe (that is, in the case of ACK/NACK and NACK/ACK), terminal 200 transmits a response signal of phase point (−1, 0). On the other hand, even when terminal 200 successfully receives only one of two pieces of downlink assignment control information transmitted in a certain subframe and successfully receives downlink data corresponding to the other downlink assignment control information (that is, in the case of ACK/DTX and DTX/ACK), terminal 200 also transmits a response signal of phase point (−1, 0). Therefore, the same phase point (−1, 0) is used in the two cases. However, base station 100 can use NACK and DTX equivalently. That is, base station 100 controls so as to retransmit downlink data in either of NACK or DTX. Therefore, when base station 100 receives a response signal of phase point (−1, 0), base station 100 determines that downlink data in a downlink component band where the response signal is detected is successfully transmitted and the other downlink data is not successfully transmitted, so that base station 100 transmits the downlink data that is not successfully transmitted. By this means, although base station 100 cannot correctly know the reception success/failure pattern of downlink assignment control information in terminal 200, there is no inconvenience for retransmission control even if the knowledge of the reception success/failure pattern is not correct.

As described above, when terminal 200 does not successfully receive both of two downlink data transmitted in a certain subframe (that is, in the case of NACK/NACK), terminal 200 transmits a response signal of phase point (1, 0). On the other hand, when terminal 200 successfully receives only one of two pieces of downlink assignment control information transmitted in a certain subframe and does not successfully receive downlink data corresponding to the downlink assignment control information (that is, in the case of NACK/DTX and DTX/NACK), terminal 200 also transmits a response signal of phase point (1, 0). Therefore, the same phase point (1, 0) is used in the two cases. However, base station 100 can use NACK and DTX equivalently. That is, base station 100 controls so as to retransmit downlink data in either of NACK or DTX. Therefore, when base station 100 receives a response signal of phase point (1, 0), base station 100 determines that both of two downlink data are not successfully transmitted, so that base station 100 transmits both downlink data. By this means, although base station 100 cannot correctly know the reception success/failure pattern of downlink assignment control information in terminal 200, there is no inconvenience for retransmission control even if the knowledge of the reception success/failure pattern is not correct.

In the interpretation rule table in FIG. 12, there are signal points that are not present in the transmission rule table in FIG. 9. For example, there is the phase point (1, 0) in the cell (1, 1) in FIG. 12. This type of phase point (1, 0) indicates that: in a component band where the response signal is detected, the downlink assignment control information is successfully received and the downlink data is not successfully received; and in the other component band, the downlink assignment control information is not successfully received. When base station 100 receives a response signal of this type of phase point (1, 0), base station 100 also determines that both of two downlink data are not successfully transmitted and transmits both downlink data. In summary, when base station 100 receives a response signal of phase point (1, 0), base station 100 retransmits all downlink data regardless of PUCCH resource where the response signal is detected.

FIG. 13 is an interpretation rule table used when the number of downlink component bands where base station 100 transmits downlink assignment control information and downlink data to terminal 200 is three. In FIG. 13, the phase point (0, −j) means that all receptions are successfully performed, that is, ACK/ACK/ACK.

Here, the cases of the phase point (−1, 0), the phase point (1, 0), and the phase point (0, −j) should be noted. In these phase points, in the same manner as in the case when the number of downlink component bands where base station 100 transmits downlink assignment control information and downlink data to terminal 200 in FIG. 12 is two, one phase point means a plurality of reception success/failure patterns. However, base station 100 can use NACK and DTX equivalently, so that there is no inconvenience for retransmission control.

Here, only the phase point (0, j) which is not described in FIG. 12 will be described. As described above, when terminal 200 successfully receives only two of three downlink data transmitted in a certain subframe (that is, in the case of ACK/NACK/ACK, ACK/ACK/NACK, and NACK/ACK/ACK), terminal 200 transmits a response signal of phase point (0, j). On the other hand, when terminal 200 successfully receives only two of three pieces of downlink assignment control information transmitted in a certain subframe and successfully receives downlink data corresponding to the two pieces of downlink assignment control information (that is, in the case of ACK/DTX/ACK, ACK/ACK/DTX, and DTX/ACK/ACK), terminal 200 also transmits a response signal of phase point (0, j). Therefore, the same phase point (0, j) is used in the two cases. However, base station 100 can use NACK and DTX equivalently. That is, base station 100 controls so as to retransmit downlink data in either of NACK or DTX. Therefore, when base station 100 receives a response signal of phase point (0, j), base station 100 determines that two downlink data in two downlink component bands that detects the response signal are successfully transmitted and the other downlink data is not successfully transmitted, and transmits the downlink data that is not successfully transmitted. By this means, although base station 100 cannot correctly know the reception success/failure pattern of downlink assignment control information in terminal 200, there is no inconvenience for retransmission control even if the knowledge of the reception success/failure pattern is not correct.

As described above, according to the present embodiment, in terminal 200, control section 208 performs transmission control of the response signal, on the basis of the reception success/failure pattern of downlink data received in downlink component bands included in a component band group set for the terminal. Control section 208 differentiates the phase point of the response signal according to the number of downlink data that are successfully received, that is, the number of ACKs in the reception success/failure pattern, and when there are a plurality of reception success/failure patterns where the number of ACKs is the same, control section 208 sets the same phase point of the response signal among the reception success/failure patterns. In other words, the phase point of response signal selected by terminal 200 varies depending on the number of downlink data that are successfully received (that is, the number of ACKs) in the reception success/failure pattern, and when the number of ACKs is the same among a plurality of reception success/failure patterns, the same phase point is used among the reception success/failure patterns.

Thereby, even when DAI is not used, whatever the condition of success/failure of decoding downlink data in terminal 200, the recognition on a condition of downlink data reaching terminal 200 (that is, the number of downlink component bands where terminal 200 successfully decodes downlink data) is not different between base station 100 and terminal 200. Thereby, although base station 100 cannot correctly know the reception success/failure pattern of downlink assignment control information, base station 100 can perform retransmission control without problem. Therefore, it is possible to realize a terminal which can maintain quality of downlink data transmitted in each downlink component band, while suppressing an increase in overhead of downlink assignment control information when carrier aggregation communication using a plurality of downlink component bands is applied.

If there are a plurality of reception success/failure patterns where the number of ACKs is the same, control section 208 maps a response signal to a different PUCCH resource for each reception success/failure pattern. That is, if there are a plurality of reception success/failure patterns where the number of ACKs is the same, the phase points of reception signals are the same among the reception success/failure patterns. However, mapped PUCCH resources are different among the reception success/failure patterns.

Thereby, base station 100 that receives response signals can identify a combination of downlink component bands where downlink data is successfully received, on the basis of PUCCH resources that receive the response signals. Thereby, even when DAI is not used, whatever the condition of success/failure of decoding downlink data in terminal 200, the recognition on a condition of downlink data reaching terminal 200 (that is, a state related to downlink component bands through which downlink data that are successfully decoded by terminal 200 are transmitted) is not different between base station 100 and terminal 200. Thereby, although base station 100 cannot correctly know the reception success/failure pattern of downlink assignment control information, base station 100 can perform retransmission control without problem.

In base station 100, retransmission control signal generation section 119 controls retransmission of downlink data, on the basis of response signals transmitted from a reception side. Specifically, retransmission control signal generation section 119 performs retransmission control according to the response signals transmitted from the reception side and a reception condition of the reception side identified on the basis of an interpretation rule table that interprets the reception condition of the reception side from the response signals. In the interpretation rule table, different phase points are assigned according to the number of downlink data that are successfully received in the reception side (that is, the number of ACKs) and, when there are a plurality of reception success/failure patterns where the number of ACKs is the same, the same phase point is assigned among the reception success/failure patterns related to downlink data.

Thereby, even when DAI is not used, whatever the condition of success/failure of decoding downlink data in terminal 200, the recognition on a condition of downlink data reaching terminal 200 (that is, the number of downlink component bands where terminal 200 successfully decodes downlink data) is not different between base station 100 and terminal 200. Thereby, even when base station 100 does not correctly know the reception success/failure patterns, base station 100 can perform retransmission control.

In the interpretation rule table, if there are a plurality of reception success/failure patterns where the number of ACKs is the same, the reception success/failure patterns are respectively associated with PUCCH resources different from each other.

Thereby, even when there are a plurality of reception success/failure patterns where the number of ACKs is the same, retransmission control signal generation section 119 can identify a combination of downlink component bands where downlink data is successfully received, on the basis of PUCCH resources that receive the response signals. Thereby, even when DAI is not used, whatever the condition of success/failure of decoding downlink data in terminal 200, the recognition on a condition of downlink data reaching terminal 200 (that is, a state related to downlink component bands through which downlink data that are successfully decoded by terminal 200 are transmitted) is not different between base station 100 and terminal 200. Thereby, although base station 100 cannot correctly know the reception success/failure pattern of downlink assignment control information, base station 100 can perform retransmission control without problem.

The above has been explained that BPSK and QPSK are employed as the modulation method, since it is assumed that three downlink component bands are included in a component band group. However, the present invention is not limited to this, and it is possible to employ higher level modulation methods such as 8-phase PSK, 16QAM, and the like. When a higher level modulation method is employed, by using a rule which is suitable to the employed modulation method and which has the features of the above-described transmission rules, even when a component band group includes four or more downlink component bands, it is possible to realize retransmission control using no DAI without problem.

The above has been explained assuming that asymmetric carrier aggregation is employed and all resources of an uplink control channel associated with downlink component bands included in a component band group are located in one uplink component band. However, the present invention is not limited to this, and it is equally possible to employ symmetric carrier aggregation and provide at least a part of resources of a plurality of uplink control channels associated with each of downlink component bands included in a component band group, in a different component band. In short, a different uplink control channel resource should be associated for each downlink component band.

The above has explained that a ZAC sequence is used for primary spreading and a blockwise spreading code sequence is used for secondary-spreading. However, the present invention may also use non-ZAC sequences which are mutually separable by different cyclic shift values for primary-spreading. For example, GCL (Generalized Chirp like) sequence, CAZAC (Constant Amplitude Zero Auto Correlation) sequence, ZC (Zadoff-Chu) sequence, M sequence, PN sequence such as orthogonal gold code sequence or a sequence randomly generated by a computer and having an abrupt auto-correlation characteristic on the time axis or the like may be used for primary-spreading. Furthermore, sequences orthogonal to each other or any sequences may be used as a blockwise spreading code sequences for secondary-spreading as long as they are regarded as sequences substantially orthogonal to each other. For example, a Walsh sequence or Fourier sequence or the like may be used for secondary-spreading as a blockwise spreading code sequence. The above defines a resource of response signal (for example, PUCCH resource) by the cyclic shift value of the ZAC sequence and the sequence number of the blockwise spreading code sequence.

Embodiment 2

Basically, Embodiment 1 has assumed that base station 100 sets a component band group including maximum three downlink component bands for terminal 200. On the other hand, Embodiment 2 assumes that the base station sets a component band group including four or more downlink component bands for the terminal. Thereby, in Embodiment 2, it is possible to perform carrier aggregation communication using a larger number of downlink component bands.

Hereinafter, the details will be described. Since the basic configurations of the base station and terminal according to Embodiment 2 are the same as those in Embodiment 1, a case will be described with reference of FIGS. 6 and 7.

<Transmission of Downlink Assignment Control Information and Downlink Data by Base Station 100>

Base station 100 of Embodiment 2 can select at least one downlink component band from a group of downlink component bands included in a component band group configured, for terminal 200 in advance, and transmit downlink assignment control information (and downlink data) using the selected downlink component bands. Here, downlink component bands 1 to 4 are included in the component band group, so that base station 100 can select maximum four downlink component bands. Furthermore, base station 100 can select different downlink component bands for each subframe. That is, if downlink component bands 1, 2, 3, and 4 are set for terminal 200 in advance, base station 100 can transmit downlink assignment control information to terminal 200 using downlink component bands 1 and 2 in a certain subframe, and transmit downlink assignment control information using all downlink component bands 1 to 4 in the next subframe.

Control information generation section 102 of base station 100 of Embodiment 2 inserts 1-bit information (partial DAI: PDAI) based on the DAI described above, only into downlink assignment control information transmitted by a specific pair (hereinafter referred to as "downlink component band pair") in a group of downlink component bands included in the component band group. That is, the PDAI indicates an arrangement condition of downlink assignment control information in a downlink component band pair. For example, the PDAI is inserted into only downlink assignment control information transmitted by downlink component bands 3 and 4. Specifically, PDAI indicating an assignment condition in downlink component band 4 is inserted into the downlink assignment control information transmitted by downlink component band 3, and PDAI indicating an assignment condition in downlink component band 3 is inserted into the downlink assignment control information transmitted by downlink component band 4.

<Reception of Downlink Assignment Control Information and Downlink Data by Terminal 200>

Terminal 200 of Embodiment 2 performs a blind decision whether or not downlink assignment control information directed to the terminal is transmitted for each subframe, in all the downlink component bands of the component band group set for the terminal.

However, when terminal 200 receives downlink assignment control information in downlink component band 3, but does not receive downlink assignment control information in downlink component band 4, decision section 207 checks the assignment condition of downlink data in downlink component band 4 from the PDAI included in the downlink assignment control information received through downlink component band 3, and decides whether the terminal fails to receive the downlink assignment control information in downlink component band 4 or base station 100 does not transmit the downlink assignment control information in downlink component band 4 in the first place. On the other hand, when terminal 200 receives downlink assignment control information in downlink component band 4, but does not receive downlink assignment control information in downlink component band 3, decision section 207 checks the assignment condition of downlink data in downlink component band 3 from the PDAI included in the downlink assignment control information received through downlink component band 4, and decides whether the terminal fails to receive the downlink assignment control information in downlink component band 3 or base station 100 does not transmit the downlink assignment control information in downlink component band 3 in the first place.

<Response by Terminal 200>

Control section 208 of terminal 200 performs transmission control over a response signal in the same manner as in Embodiment 1, based on the error detection result received from CRC section 211.

However, control section 208 calculates logical AND of two error detection results related to downlink data transmitted by a downlink component band pair and generates one error detection result, that is, a bundled ACK. In other words, by bundling two error detection results of downlink data transmitted by downlink component bands 3 and 4, control section 208 obtains a bundled ACK. Embodiment 2 uses the bundled ACK as a normal ACK signal or a normal NACK signal. Specifically, when both downlink data transmitted by a downlink component band pair are successfully received, the bundled ACK indicates ACK, and when at least one downlink data is not successfully received, the bundled ACK indicates NACK. Thereby, even when there are four downlink component bands, it is possible to perform the same control as that in Embodiment 1 where it is assumed that there are three downlink component bands.

Figure 14:
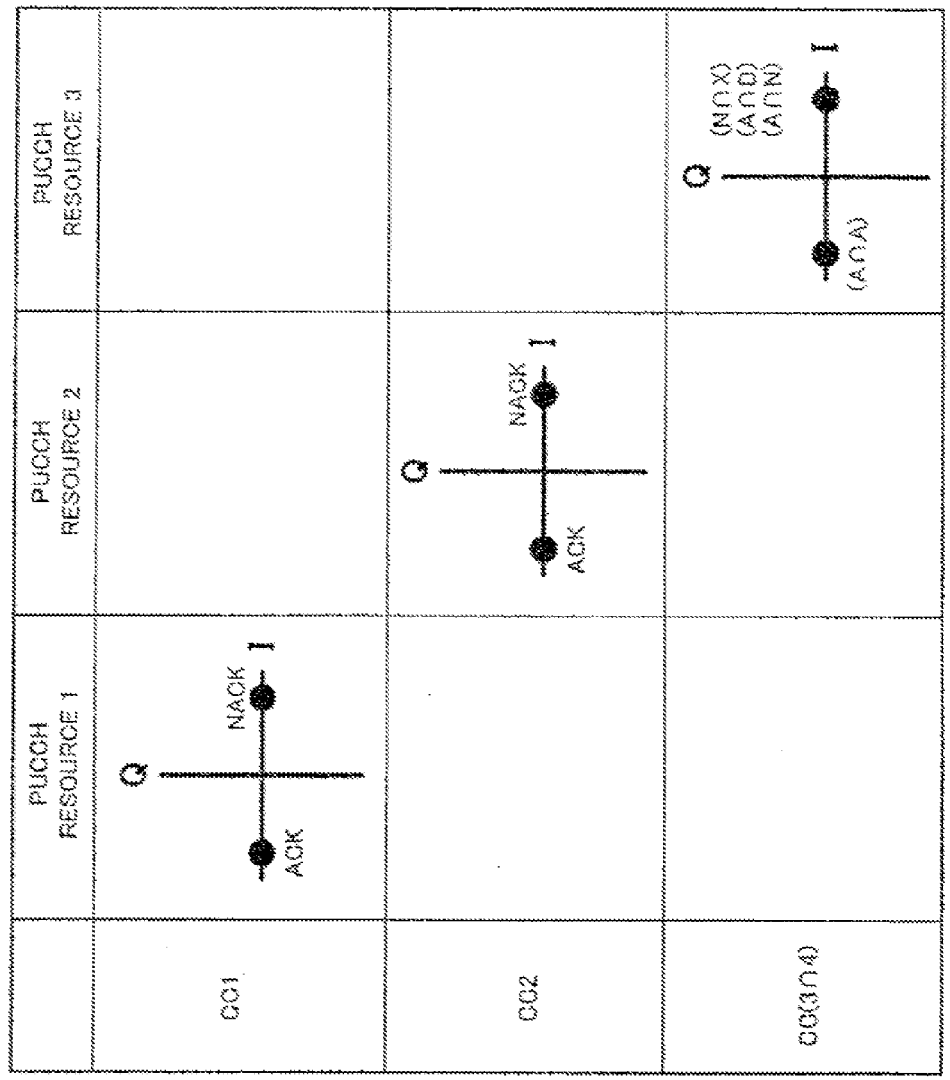
FIG. 14 illustrates a transmission method of a response signal by a terminal according to Embodiment 2.
Figure 15:
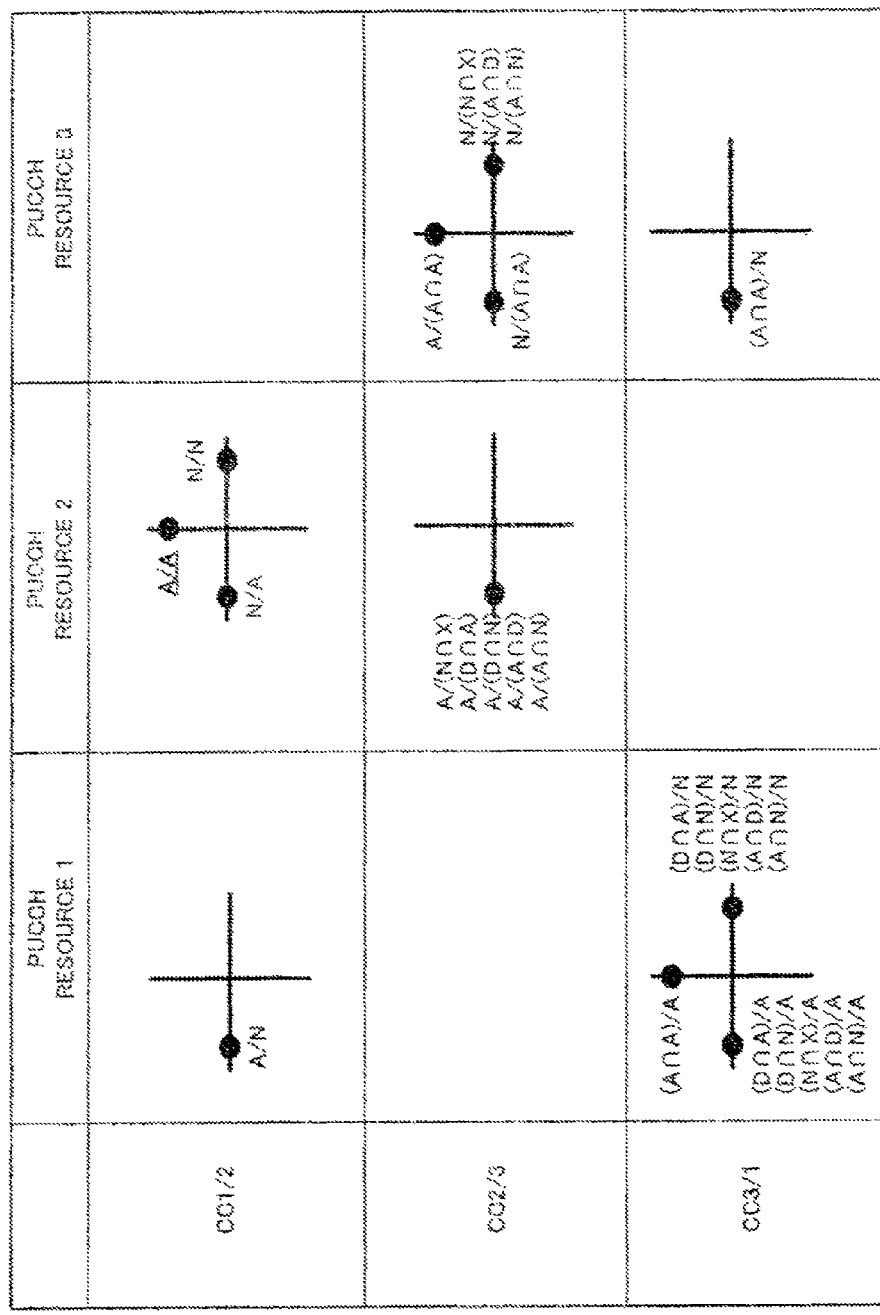
FIG. 15 illustrates a transmission method of a response signal by the terminal according to Embodiment 2.
Figure 16:
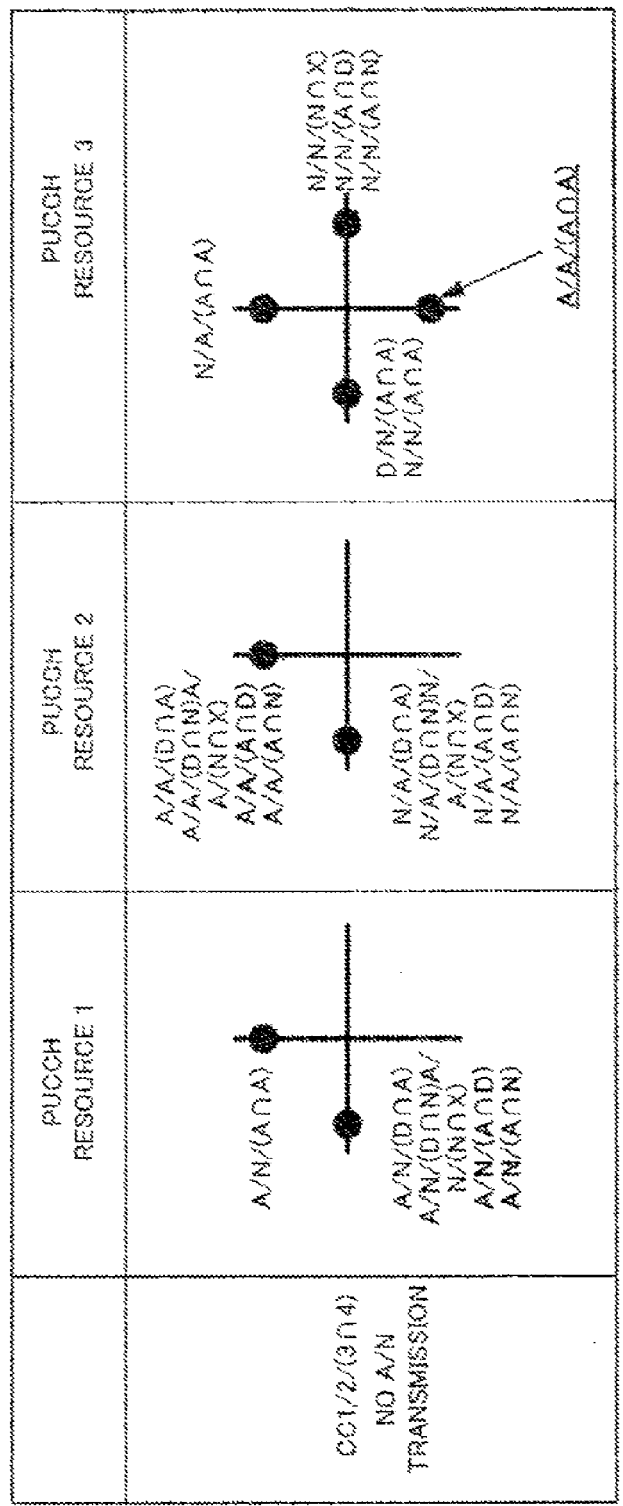
FIG. 16 illustrates a transmission method of a response signal by the terminal according to Embodiment 2.
Figure 17:
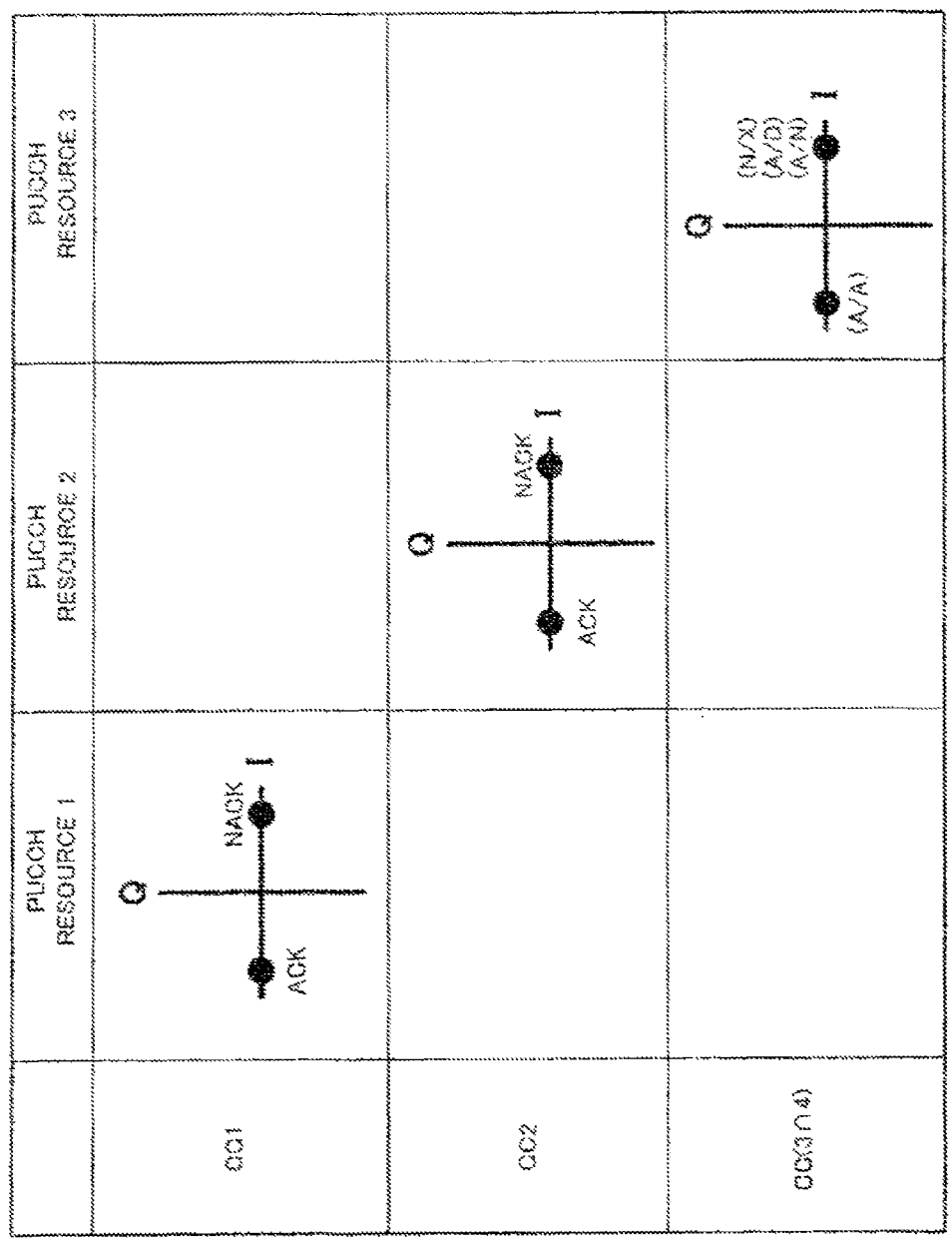
FIG. 17 illustrates a retransmission control method by a base station according to Embodiment 2.
Figure 18:
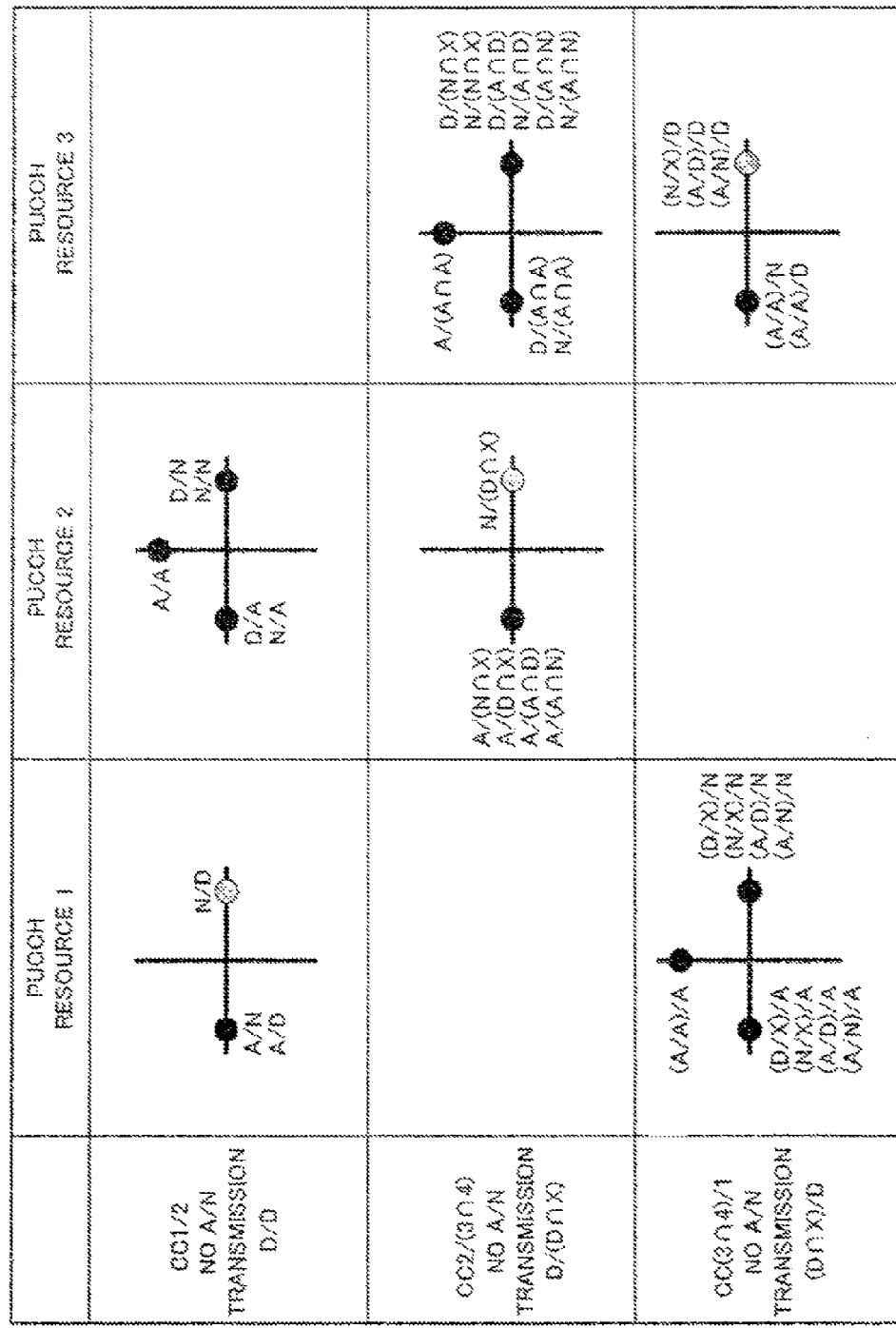
FIG. 18 illustrates a retransmission control method by the base station according to Embodiment 2.
Figure 19:
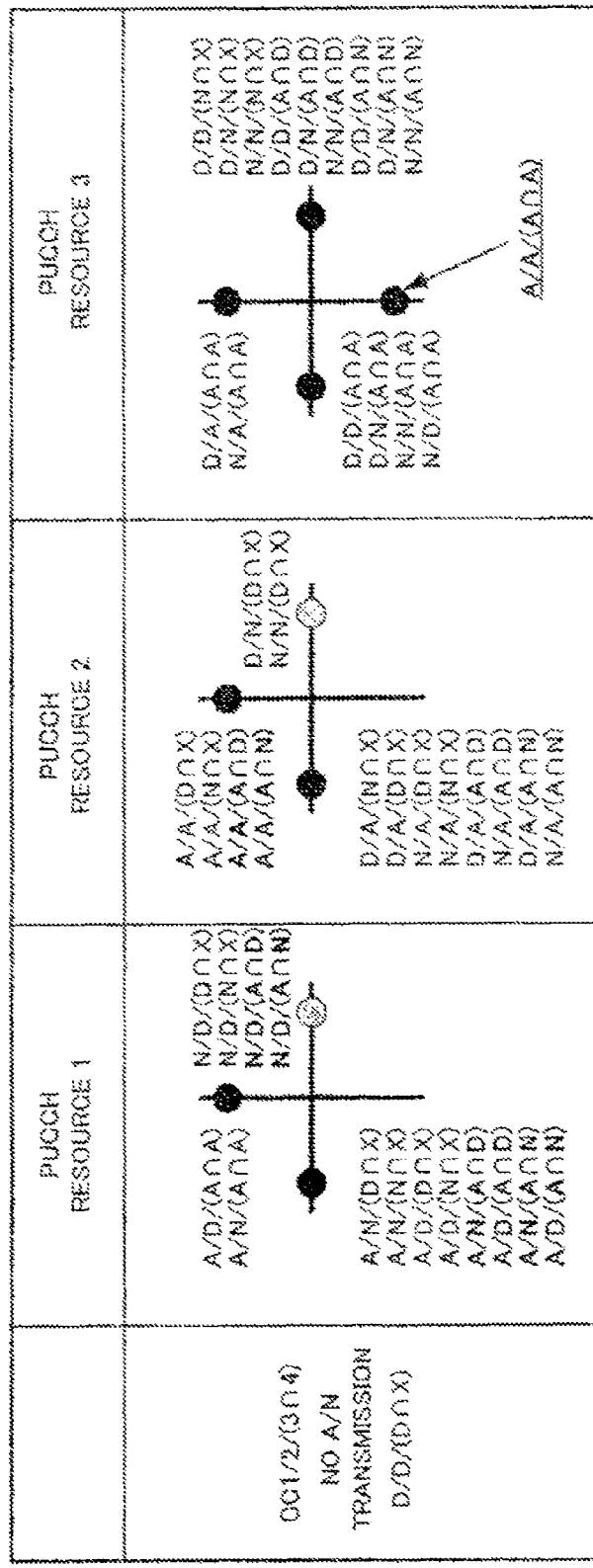
FIG. 19 illustrates a retransmission control method by the base station according to Embodiment 2.

More specifically, only when both downlink data received though downlink component bands 3 and 4 are successfully decoded, the control section 208 handles this case in the same manner as a case where the downlink data in downlink component band 3 is "ACK" in Embodiment 1; and in cases other than the above (when terminal 200 fails to decode both downlink data received though downlink component bands 3 and 4, and when terminal 200 fails to decode one of two downlink data (when terminal 200 successfully receives downlink assignment control information, but fails to decode downlink data; or when terminal 200 does not detect downlink assignment control information but recognizes a reception failure of the downlink assignment control information from PDAI included in the other downlink assignment control information)), the control section 208 handles these cases in the same manner as a case where the downlink data in downlink component band 3 is "NACK" in Embodiment 1. The transmission rule tables of terminal 200 at this time are collectively illustrated in FIGS. 14 to 16. Here, Xs in FIGS. 14 to 16 indicate any one condition of "ACK, NACK, and DTX".

<Retransmission Control by Base Station 100>

Retransmission control signal generation section 119 generates a retransmission control signal, on the basis of the response signal from the terminal and transmits the result to data transmission control section 106. FIGS. 11 to 19 illustrate a retransmission control method by base station 100 of Embodiment 2. The details are the same as the operations in Embodiment 1, so that the description thereof will be omitted here.

As described above, according to the present embodiment, in terminal 200, control section 208 integrates pieces of information related to the reception success/failure of downlink data in the downlink component band pair into one. That is, control section 208 integrates the pieces of information into a bundled ACK.

Thereby, it is possible to use without change the transmission control rule of Embodiment 1 assuming that the number of component bands included in a component band group is small. That is, in the same manner as in Embodiment 1, terminal 200 simply generates a response signal based on downlink assignment control information that can be received by terminal 200, without considering whether or not base station 100 actually transmits downlink assignment control information and downlink data in component bands 1 and 2, so that base station 100 can perform appropriate retransmission control.

In base station 100, control information generation section 102 inserts PDAI only into downlink assignment control information transmitted by a downlink band pair.

Thereby, terminal 200 can perform bundling for the reception success/failure of downlink data in a downlink component band pair. PDAI of a downlink component band pair may be one bit. Therefore, it is possible to reduce overhead of downlink assignment control information as compared with a case where DAI is introduced to all downlink component bands.

Although the above description describes a case where a component band group including four downlink component bands is set in terminal 200, it is possible to apply Embodiment 2 to a case where a component band group including five or more downlink component bands is set in terminal 200. In this case, for example, two error detection results of downlink data transmitted by downlink component band 2 and downlink component band 5 are bundled.

Although the above description describes a case where bundling is applied, when a component band group including four downlink component bands is set in terminal 200, for example, a new phase point may be added by using 8-phase PSK. Thereby, four downlink component bands can be used without using bundling.

Figure 20:
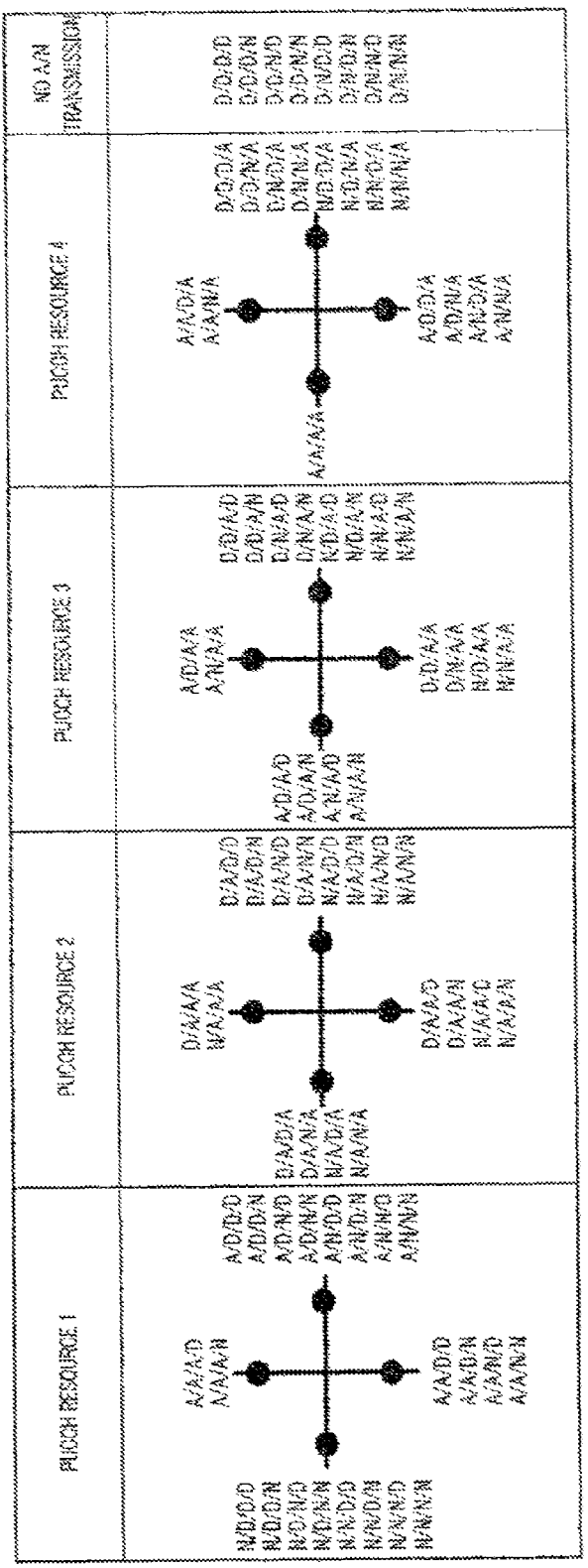
FIG. 20 illustrates a variation of a transmission method of a response signal by the terminal according to Embodiment 2.

Only when a component band group including four downlink component bands is set in terminal 200, an independent mapping of ACK/NACK may be used. In this case, when a bit indicating "downlink assignment control information is transmitted in four downlink component bands" is added in the downlink assignment control information transmitted to terminal 200 and terminal 200 recognizes that "downlink assignment control information is transmitted in four downlink component bands" by the bit, for example, a mapping as illustrated in FIG. 20 is performed.

OTHER EMBODIMENTS (1) Although the embodiments described above has described that downlink data and downlink assignment control information corresponding to the downlink data are transmitted in the same downlink component band, the present embodiment is not limited to this. That is, even when a component band where downlink data is transmitted is different from a component band where downlink assignment control information corresponding to the downlink data is transmitted, it is possible to apply the embodiments if channel selection is used for a feedback of an uplink response signal. In this case, terminal 200 transmits a response signal by using a PUCCH resource N associated with CCE occupied by downlink assignment control information N (which is not necessarily present in a downlink component band N) corresponding to downlink data N transmitted in the downlink component band N.

(2) Although the embodiments described above has described that the PUCCH resource N used by terminal 200 is associated with CCE occupied by downlink assignment control information received by terminal 200, the present embodiment is not limited to this. For example, even when the PUCCH resource N is separately signaled to terminal 200, it is possible to apply the present embodiment.

(3) The above-described embodiments have described a case where only one uplink component band is included in a component band group in asymmetric carrier aggregation configured for the terminal. However, the present invention is not limited to this, and it is possible to apply the present embodiment to a case where a plurality of uplink component bands are included in the component band group or symmetric carrier aggregation is configured for the terminal.

(4) The above-described embodiments have described asymmetric carrier aggregation only. However, the present invention is not limited to this, and it is possible to apply the present invention to a case where symmetric carrier aggregation is set with respect to data transmission. In short, it is possible to apply the present invention to any case where a plurality of PUCCH regions are defined in uplink component bands included in the component band group of the terminal and a PUCCH region including PUCCH resources to be used is determined according to the condition of success/failure in reception of downlink data.

(5) Moreover, although cases have been described with the embodiments above where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-185152, filed on Aug. 7, 2009, including the specification, drawings and abstract is incorporated herein by reference in its entirety.

INDUSTRIAL APPLICABILITY

The terminal apparatus and retransmission control method of the present invention are effective, which can maintain quality of downlink data transmitted in each downlink component band, while suppressing an increase in overhead of downlink assignment control information, when carrier aggregation communication using a plurality of downlink component bands is applied.

REFERENCE SIGNS LIST

100 Base station
101 Control section
102 Control information generation section
103, 105 Coding section
104, 107, 213 Modulation section
106 Data transmission control section
108 Mapping section
109, 216 IFFT section
110, 217 CP adding section
111, 218 Radio transmitting section
112, 201 Radio receiving section
113, 202 CP removing section
114 PUCCH extraction section
115 Despreading section
116 Sequence control section
117 Correlation processing section
118 Decision section
119 Retransmission control signal generation section
200 Terminal
203 FFT section
204 Extraction section
205, 209 Demodulation section
206, 210 Decoding section
207 Decision section
208 Control section
211 CRC section
212 Response signal generation section
214 Primary-spreading section
215 Secondary-spreading section

The invention claimed is:

1. An integrated circuit comprising:
transmission circuitry which, in operation, controls transmission, to a terminal configured with one or more downlink component carrier(s), of downlink assignment information indicating one or more resources for downlink data, each of the one or more resources being assigned to one of the one or more downlink component carrier(s), and controls transmission of the downlink data to the terminal; and
reception circuitry, which, in operation, controls reception of one or more response signals for the downlink data, which is transmitted from the terminal, wherein:
each response signal denotes an outcome of decoding downlink data, or denotes a Discontinuous Transmission (DTX) representing that the outcome is not transmitted;
when downlink component carriers including a first downlink component carrier and a second downlink component carrier are configured, response signals for a plurality of downlink data in the downlink component carriers are transmitted using at least one phase point and at least one resource index of at least one uplink control channel depending on an outcome of decoding each of the plurality of downlink data; and
a first outcome that a first response signal for downlink data in the first downlink component carrier denotes with a first phase point, with which a second response signal for downlink data in the second downlink component carrier denotes the DTX, is the same as the first outcome, which a third response signal for downlink data in the first downlink component carrier denotes with the same first phase point when only the first downlink component carrier is configured, such that:
when the first downlink component carrier and the second component carrier are configured, an acknowledgment (ACK) for downlink data in the first downlink component carrier and a DTX for downlink data in the second downlink component carrier are denoted by the first response signal and the second response signal with the first phase point; and
when only the first downlink component carrier is configured, an ACK for downlink data in the first downlink component carrier is denoted by the third response signal with the same first phase point.

2. The integrated circuit according to claim 1, further comprising:
at least one input coupled to the reception circuitry, wherein the at least one input, in operation, inputs data; and
at least one output coupled to the transmission circuitry, wherein the at least one output, in operation, outputs data.

3. The integrated circuit according to claim 1, further comprising:
a memory coupled to the reception circuitry.

4. The integrated circuit according to claim 3, wherein the first outcome that the first response signal for downlink data in the first downlink component carrier denotes with the first phase point and a first resource index of a first uplink control channel, with which the second response signal for downlink data in the second downlink component carrier denotes the DTX, is same as the first outcome, which the third response signal for downlink data in the first downlink component carrier denotes with the same first phase point and the same first resource index when only the first downlink component carrier is configured.

5. The integrated circuit according to claim 3, wherein:
said transmission of the downlink assignment information includes transmission of the downlink assignment information on a control channel element (CCE), and a first resource index of a first uplink control channel is associated with a CCE number;
the first outcome that the first response signal for downlink data in the first downlink component carrier denotes with the first phase point and the first resource index associated with the CCE number, with which the second response signal for downlink data in the second downlink component carrier denotes the DTX, is same as the first outcome, which the third response signal for downlink data in the first downlink component carrier denotes with the same first phase point and the first resource index associated with the CCE number when only the first downlink component carrier is configured.

6. The integrated circuit according to claim 3, wherein:
when a carrier aggregation is set, the downlink component carriers including the first downlink component carrier and the second downlink component carrier are configured; and
when the carrier aggregation is not set, only the first downlink component carrier is configured.

7. The integrated circuit according to claim 3, wherein the outcome of the decoding is denoted by ACK or NACK, and the DTX represents that downlink assignment information for the downlink data is not detected in the terminal.

8. The integrated circuit according to claim 3, wherein said transmission of the downlink assignment information includes transmission of the downlink assignment information on a control channel element (CCE), and a first resource index of a first uplink control channel is associated with a CCE number.

9. The integrated circuit according to claim 3, wherein a combination of outcomes of decoding the plurality of downlink data is associated with the first phase point and a first resource index of a first uplink control channel.

10. The integrated circuit according to claim 9, wherein different combinations of outcomes of decoding the plurality of downlink data are respectively associated with different phase points and different resource indexes of uplink control channels.

11. An integrated circuit comprising:
transmission circuitry which, in operation, controls transmission, to a terminal configured with one or more downlink component carrier(s), of downlink assignment information indicating one or more resources for downlink data, each of the one or more resources being assigned to one of the one or more downlink component carrier(s), and controls transmission of the downlink data to the terminal; and
reception circuitry, which, in operation, controls reception of one or more response signals for the downlink data, which is transmitted from the terminal, wherein:
each response signal denotes an outcome of decoding downlink data, or denotes a Discontinuous Transmission (DTX) representing that the outcome is not transmitted;
when downlink component carriers including a first downlink component carrier and a second downlink component carrier are configured, a given number of response signals for a plurality of downlink data in the downlink component carriers are transmitted using at least one phase point and at least one resource index of at least one uplink control channel depending on an outcome of decoding each of the plurality of downlink data; and
a first outcome that a first response signal for downlink data in the first downlink component carrier among the given number of response signals denotes with a first phase point, with which a second response signal for downlink data in the second downlink component carrier among the given number of the response signals denotes the DTX, is same as the first outcome that a third response signal denotes with the same first phase point when response signals, a number of which is one less than the given number, are transmitted, such that:
when the first downlink component carrier and the second component carrier are configured, an acknowledgment (ACK) for downlink data in the first downlink component carrier and the DTX for downlink data in the second downlink component carrier are denoted by the first response signal and the second response signal with the first phase point; and
when only the first downlink component carrier is configured, an ACK for downlink data in the first downlink component carrier is denoted by the third response signal with the same first phase point.

12. The integrated circuit according to claim 11, further comprising:
at least one input coupled to the reception circuitry, wherein the at least one input, in operation, inputs data; and
at least one output coupled to the transmission circuitry, wherein the at least one output, in operation, outputs data.

13. The integrated circuit according to claim 11, further comprising:
a memory coupled to the reception circuitry.

14. The integrated circuit according to claim 13, wherein the first outcome that the first response signal for downlink data in the first downlink component carrier among the given number of response signals denotes with the first phase point and a first resource index of a first uplink control channel, with which the second response signal for downlink data in the second downlink component carrier among the given number of the response signals denotes the DTX, is same as the first outcome that the third response signal denotes with the same first phase point and the same first resource index when response signals, a number of which is one less than the given number, are transmitted.

15. The integrated circuit according to claim 13, wherein:
said transmission of the downlink assignment information includes transmission of the downlink assignment information on a control channel element (CCE), and a first resource index of a first uplink control channel is associated with a CCE number;
the first outcome that the first response signal for downlink data in the first downlink component carrier among the given number of response signals denotes with the first phase point and the first resource index associated with the CCE number, with which the second response signal for downlink data in the second downlink component carrier among the given number of the response signals denotes the DTX, is same as the first outcome that the third response signal denotes with the same first phase point and the first resource index associated with the CCE number when response signals, a number of which is one less than the given number, are transmitted.

16. An integrated circuit comprising:
circuitry, which, in operation, controls transmitting, to a terminal configured with one or more downlink component carrier(s), downlink assignment information indicating one or more resources for downlink data, each of the one or more resources being assigned to one of the one or more downlink component carrier(s), and transmitting the downlink data to the terminal; and controls receiving one or more response signals for the downlink data, which is transmitted from the terminal; and
at least one input coupled to the circuitry, wherein the at least one input, in operation, inputs data, wherein:
each response signal denotes an outcome of decoding downlink data, or denotes a Discontinuous Transmission (DTX) representing that the outcome is not transmitted;
when downlink component carriers including a first downlink component carrier and a second downlink component carrier are configured, response signals for a plurality of downlink data in the downlink component carriers are transmitted using at least one phase point and at least one resource index of at least one uplink control channel depending on an outcome of decoding each of the plurality of downlink data; and
a first outcome that a first response signal for downlink data in the first downlink component carrier denotes with a first phase point, with which a second response signal for downlink data in the second downlink component carrier denotes the DTX, is the same as the first outcome, which a third response signal for downlink data in the first downlink component carrier denotes with the same first phase point when only the first downlink component carrier is configured, such that:

when the first downlink component carrier and the second component carrier are configured, an acknowledgment (ACK) for downlink data in the first downlink component carrier and a DTX for downlink data in the second downlink component carrier are denoted by the first response signal and the second response signal with the first phase point; and when only the first downlink component carrier is configured, an ACK for downlink data in the first downlink component carrier is denoted by the third response signal with the same first phase point.

17. The integrated circuit according to claim 16, comprising:

at least one output coupled to the circuitry, wherein the at least one output, in operation, outputs data.

18. The integrated circuit according to claim 16, comprising:

a memory coupled to the circuitry.

19. An integrated circuit comprising:

circuitry, which, in operation, controls transmitting, to a terminal configured with one or more downlink component carrier(s), downlink assignment information indicating one or more resources for downlink data, each of the one or more resources being assigned to one of the one or more downlink component carrier(s), and transmitting the downlink data to the terminal; and controls receiving one or more response signals for the downlink data, which is transmitted from the terminal; and at least one input coupled to the circuitry, wherein the at least one input, in operation, inputs data, wherein:

each response signal denotes an outcome of decoding downlink data, or denotes a Discontinuous Transmission (DTX) representing that the outcome is not transmitted;

when downlink component carriers including a first downlink component carrier and a second downlink component carrier are configured, a given number of response signals for a plurality of downlink data in the downlink component carriers are transmitted using at least one phase point and at least one resource index of at least one uplink control channel depending on an outcome of decoding each of the plurality of downlink data; and a first outcome that a first response signal for downlink data in the first downlink component carrier among the given number of response signals denotes with a first phase point, with which a second response signal for downlink data in the second downlink component carrier among the given number of the response signals denotes the DTX, is same as the first outcome that a third response signal denotes with the same first phase point when response signals, a number of which is one less than the given number, are transmitted, such that:

when the first downlink component carrier and the second component carrier are configured, an acknowledgment (ACK) for downlink data in the first downlink component carrier and the DTX for downlink data in the second downlink component carrier are denoted by the first response signal and the second response signal with the first phase point; and when only the first downlink component carrier is configured, an ACK for downlink data in the first downlink component carrier is denoted by the third response signal with the same first phase point.

20. The integrated circuit according to claim 19, comprising:

at least one output coupled to the circuitry, wherein the at least one output, in operation, outputs data.

21. The integrated circuit according to claim 19, comprising:

a memory coupled to the circuitry.

* * * * *

UNITED STATES PATENT AND TRADEMARK OFFICE
CERTIFICATE OF CORRECTION

PATENT NO. : 9,526,097 B2  
APPLICATION NO. : 14/959754  
DATED : December 20, 2016  
INVENTOR(S) : Nakao et al.

Page 1 of 1

It is certified that error appears in the above-identified patent and that said Letters Patent is hereby corrected as shown below:

On the Title Page

Item (56):
Delete "CATT, "UL ACK/NACK transmission scheme for LTE-A," R1-092789, GPP TSG RAN WG1 meeting # 57bis, Los Angeles, CA, USA, June 29 - July 3, 2009, 3 pages." and insert --CATT, "UL ACK/NACK transmission scheme for LTE-A," R1-092789, 3GPP TSG RAN WG1 meeting # 57bis, Los Angeles, CA, USA, June 29 - July 3, 2009, 3 pages.--.

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*